United States Patent [19]

Kishida et al.

[11] Patent Number: 5,914,758
[45] Date of Patent: Jun. 22, 1999

[54] LIQUID CRYSTAL DISPLAY WITH NON-LINEAR SWITCHING ELEMENTS HAVING ELECTRODE PORTION SUBSTANTIALLY SURROUNDING UPPER ELECTRODE

[75] Inventors: Masahiro Kishida, Nabari; Masahiro Nakano, Yamatokoriyama; Yohsuke Fujikawa, Tenri; Toshiyuki Yoshimizu, Soraku-gun; Toshiaki Fukuyama, Nara, all of Japan

[73] Assignee: Sharp Kabushiki Kaisha, Osaka, Japan

[21] Appl. No.: 08/613,138

[22] Filed: Mar. 8, 1996

[30] Foreign Application Priority Data

| Mar. 10, 1995 | [JP] | Japan | 7-051081 |
| Jul. 20, 1995 | [JP] | Japan | 7-183972 |

[51] Int. Cl.⁶ .................................................. G02F 1/136
[52] U.S. Cl. ................................ 349/51; 349/49; 257/30
[58] Field of Search ........................ 349/49, 51; 257/30

[56] References Cited

U.S. PATENT DOCUMENTS

| 5,153,753 | 10/1992 | Ohta et al. | 359/58 |
| 5,396,353 | 3/1995 | Takahashi et al. | 359/58 |
| 5,539,549 | 7/1996 | Kishida | 359/58 |

FOREIGN PATENT DOCUMENTS

| 2-81031 | 3/1990 | Japan . |
| 4-83229 | 3/1992 | Japan . |
| 5-10652 | 2/1993 | Japan . |
| 6230435 | 8/1994 | Japan . |

Primary Examiner—William L. Sikes
Assistant Examiner—Kenneth Parker
Attorney, Agent, or Firm—David G. Conlin; George W. Neuner

[57] ABSTRACT

The liquid crystal display apparatus of this invention includes a pair of substrates facing each other and a liquid crystal layer interposed between the pair of substrates. At least one of the pair of substrates having on a surface thereof: pixel electrodes arranged in rows and columns; a plurality of signal lines; and a plurality of nonlinear switching elements for connecting each of the plurality of signal lines to a corresponding column of pixel electrodes. Each switching element has a lower electrode, an insulating film formed on the lower electrode, and an upper electrode formed on the insulating electrode, the lower electrode being a branch of the corresponding signal line, wherein the lower electrode has a first portion with a width larger than a width of a second portion overlapping the insulating film and the upper electrode, the first portion being located farther from the corresponding signal line than the second portion.

18 Claims, 19 Drawing Sheets

LIQUID CRYSTAL DISPLAY WITH NON-LINEAR SWITCHING ELEMENTS HAVING ELECTRODE PORTION SUBSTANTIALLY SURROUNDING UPPER ELECTRODE

BACKGROUND OF THE INVENTION

1. Field of the Invention

The present invention relates to a liquid crystal display apparatus where an electric signal is applied to each display electrode via a nonlinear element, and a method for fabricating the same.

2. Description of the Related Art

In recent years, in order to respond to the requests for increasing the contrast and the display capacity of liquid crystal display apparatus, liquid crystal display apparatus having various types of active elements have been proposed. Among them, an apparatus incorporating nonlinear elements having a structure of metal-insulator-metal (MIM) (hereinafter, such an element is referred to as a MIM element) has attracted attention because the fabrication process thereof is comparatively simple.

A typical MIM element is composed of a lower electrode made of tantalum (Ta) formed on a glass substrate and an upper electrode made of titanium (Ti), chromium (Cr), and aluminum (Al) formed on the lower electrode via an insulating film made of tantalum pentaoxide ($Ta_2O_5$). The upper and lower electrodes are desirably formed of a same material in consideration of the symmetry of the current-voltage (I-V) characteristic of the MIM element, i.e., the positive-negative symmetry when a current flowing from one electrode to the other is referred to as a positive current. When a same material is used for the upper and lower electrodes, however, the lower electrodes may become corroded at the patterning of the upper electrodes. Accordingly, photolithography and etching can not be used for the patterning of the upper electrodes. This is why the above-mentioned materials are used for the formation of the upper electrodes. Using these materials, the lower electrodes will not be corroded, and the positive-negative symmetry of the I-V characteristic of the MIM elements will not be significantly diminished.

A known liquid crystal display apparatus using such MIM elements as switching elements is disclosed in Japanese Patent Publication No. 5-10652. Referring to FIGS. 14 to 20, this conventional liquid crystal display apparatus will be described.

FIGS. 14 and 15 are a plan view and a sectional view, respectively, of the portion of a substrate 41 where a plurality of MIM elements are formed (hereinafter, such a substrate is referred to as an element-formed substrate), corresponding to one MIM element. FIG. 16 is a partial plan view of the element-formed substrate 41. The element-formed substrate 41 includes a glass substrate 42 and signal lines 43, MIM elements 47, and pixel electrodes 48 formed on the glass substrate 42, As shown in FIG. 14, each signal line 43, which is made of Ta, has a branch 44 which serves as a lower electrode of each MIM element 47. An insulating film 45 is formed on the signal line 43 or the lower electrode 44. The insulating film 45 is made of $Ta_2O_5$ formed by anodization. An upper electrode 46 made of Ti is formed on the insulating film 45. As shown in FIGS. 14 and 15, the ends of the upper electrode 46 are electrically connected to the corresponding pixel electrode 4a made of ITO (indium-tin-oxide) and the like.

Further, as shown in FIG. 15, island portions 50 can be formed near the lower electrode 44 constituting the MIM element 47 simultaneously with the formation of the signal line 43 and the lower electrode 44 in the same step, so as to ensure the electrical connection between the lower electrode 44 and the pixel electrode 48.

As shown in FIG. 17, a counter substrate 51 located parallel to the element-formed substrate 41 includes a glass substrate 52 and a plurality of counter electrodes 53 formed in a stripe on the glass substrate 52. The element-formed substrate 41 and the counter substrate 51 are bonded together so that the geometric planes of the signal lines 43 and the counter electrodes 53 are perpendicular to each other. Liquid crystal is then injected into a space between the substrates 41 and 51. Thus, a liquid crystal display apparatus as shown in FIG. 18 is fabricated.

At the operation of pixels of the liquid crystal display apparatus, the portions of liquid crystal molecules except for those present above the pixel electrodes 48 have no contribution to display. Further, since light leaks through the gaps between the pixel electrodes 48, the contrast of display may lower, especially in the case of the normally white mode. For the above reasons, a black organic polymer film is formed by printing or a metal or metal oxide film is formed by photolithography as a black mask on the counter substrate 51, at positions corresponding to the gaps between the pixel electrodes 48 when the counter substrate 51 and the element-formed substrate 41 are bonded together.

In order to achieve high-grade and high-precision display by the liquid crystal display apparatus having the above structure, it is necessary that the capacity of the MIM element 47 be as small as possible while the capacity of the liquid crystal be sufficiently large compared with the capacity of the MIM element 47, In order to reduce the capacity of the MIM element 47, the size thereof can be reduced. However, the size of the MIM element 47 is restricted by an exposing apparatus used in the fabrication process and an etching method employed. Moreover, it is difficult to stably form the components of the MIM elements 47 with a width of several microns by patterning. As a result, the lower electrode 44 (i.e., the branch of the signal line 43) becomes narrower at the end as shown in FIG. 14 when it is formed by patterning by photolithography. Therefore, the width of the portion of the lower electrode 44 which is to constitute the MIM element 47 together with the insulating film 45 and the upper electrode 46 is unstable. This results in a variation in the size of the MIM elements 47 and thus a variation in the capacitance thereof. An error therefore arises in the ratio of the capacitance of the MIM element 47 to that of the liquid crystal, generating display variation and thus significantly reducing production yield.

In order to achieve high-contrast display, the area of the display plane except for the portions used as pixels to be driven needs to be as small as possible, so as to effectively use light incident to the liquid crystal display apparatus. In a transparent-type normally-white mode liquid crystal display apparatus, a black mask is required to prevent light from leaking through gaps between the pixel electrodes 48 when the pixels are being driven and thus to prevent contrast from lowering. The formation of a black mask, however, increases the number of fabrication steps, resulting in cost increase.

The upper electrode 46 of the MIM element 47 also becomes narrower at the end, as in the case of the lower electrode 44. The pattern of the upper electrodes 46 is finer as compared with the area of the glass substrate 42. The density of the pattern to be used for etching is therefore low (i.e., the portion to be etched per unit area is large). Thus, the etching rate becomes high, resulting in over-etching where etching proceeds excessively beyond a predetermined pattern (shown by the dotted line in FIG. 19). The over-etching gradually proceeds from the corners of the pattern and finally reaches the portion thereof where the lower electrode 44 is formed underneath. Thus, the width of the portion of the upper electrode 46 located above the lower electrode 44 is also unstable. This results in a variation in the capacitance of the MIM elements 47, as in the case of the lower electrode 44. An error arises in the ratio of the capacitance of the MIM element 47 to that of the liquid crystal, generating display variation and thus significantly reducing production yield.

The above trouble of the unstable width of the upper electrode 46 arises whichever material, Al, Cr, or Ti is used for the upper electrode. This trouble is especially significant when Ti is used. When Al is used for the upper electrode, the positive-negative symmetry of the I-V characteristic, the non-linearity, and the contrast of the resultant liquid crystal display apparatus are low, compared with when Cr or Ti is used. When Cr is used for the upper electrode, a harmful ionic substance such as hexavalent chromium is generated at the etching. This requires additional steps and facilities for treating such a harmful substance, resulting in cost increase.

SUMMARY OF THE INVENTION

The liquid crystal display apparatus of this invention includes a pair of substrates facing each other and a liquid crystal layer interposed between the pair of substrates, at least one of the pair of substrates having on a surface thereof; pixel electrodes arranged in rows and columns; a plurality of signal lines, and a plurality of nonlinear switching elements for connecting each of the plurality of signal lines to a corresponding column of pixel electrodes, each of the switching elements having a lower electrode, an insulating film formed on the lower electrode, and an upper electrode formed on the insulating electrode, the lower electrode being a branch of the corresponding signal line, wherein the lower electrode has a first portion with a width larger than a width of a second portion overlapped by the insulating film and the upper electrode, the first portion being located farther from the corresponding signal line than the second portion.

In one embodiment of the invention, the liquid crystal display apparatus further includes at least one island portion which is formed from a same film used for the formation of the lower electrode near the lower electrode and has a shape depending on a shape of the lower electrode.

In another embodiment of the invention, a plurality of island portions are formed near the lower electrode, each of the plurality of island portions has a side facing the lower electrode, and the distance between the side of one of the plurality of island portions and the lower electrode is substantially equal to the distance between the side of any other one of the plurality of island portions and the lower electrode.

In still another embodiment of the invention, the lower electrode is in a T shape, and a plurality of island portions of an L shape are formed near the lower electrode.

In still another embodiment of the invention, an end of the upper electrode and a portion of the pixel electrode are in direct contact with the island portion so as to realize ohmic contact between the lower electrode and the pixel electrode.

In still another embodiment of the invention, light shade films are formed from a same film used for the formation of the signal lines on at least one of the pair of substrates at regions between the adjacent pixel electrodes.

In still another embodiment of the invention, the signal lines, the pixel electrodes, and the light shade films are formed on one of the pair of substrates, and additional light shade films are formed on the other substrate at regions facing the regions between the adjacent pixel electrodes.

In still another embodiment of the invention, a portion of each of the light shade films overlaps each of the signal lines, the width of the portion being 10 μm or less.

In still another embodiment of the invention, all the additional light shade films are electrically connected to one another.

Alternatively, the liquid crystal display apparatus of this invention includes a pair of substrates facing each other and a liquid crystal layer interposed between the pair of substrates, at least one of the pair of substrates having on a surface thereof: pixel electrodes arranged in rows and columns; a plurality of signal lines; and a plurality of nonlinear switching elements for connecting each of the plurality of signal lines to a corresponding column of pixel electrodes, each of the switching elements having a lower electrode, an insulating film formed on the lower electrode, and an upper electrode formed on the insulating film, the lower electrode being a branch of the corresponding signal line, wherein the upper electrode has a first portion with a width larger than a width of a second portion overlapping the lower electrode and the insulating film, the first portion being located farther from the corresponding signal line than the second portion.

In one embodiment of the invention, the liquid crystal display apparatus further includes at least one island portion which is formed from a same film used for the formation of the upper electrode near the upper electrode.

In another embodiment of the invention, the island portion is formed so as to substantially surround the upper electrode.

Alternatively, the liquid crystal display apparatus of this invention includes a pair of substrates opposing each other and a liquid crystal layer interposed between the pair of substrates, at least one of the pair of substrates having on a surface thereof: pixel electrodes arranged in rows and columns; a plurality of signal lines; and a plurality of nonlinear switching elements for connecting each of the plurality of signal lines to a corresponding column of pixel electrodes, each of the switching elements having a lower electrode, an insulating film formed on the lower electrode, and an upper electrode formed on the insulating film, the lower electrode being a branch of the corresponding signal line, wherein at least one island portion is formed from a same film used for the formation of the upper electrode near the upper electrode.

In one embodiment of the invention, the island portion is formed so as to substantially surround the upper electrode.

In another embodiment of the invention, the upper electrode is made of titanium.

According to another aspect of the invention, a method for fabricating a liquid crystal display apparatus including a pair of substrates facing each other and a liquid crystal layer interposed between the pair of substrates is provided. The method includes the steps of: forming a plurality of signal lines and pixel electrodes arranged in rows and columns on at least one of the pair of substrates; and forming a plurality of nonlinear switching elements for connecting each of the plurality of signal lines to a corresponding column of pixel electrodes, each of the switching elements having a lower electrode, an insulating film formed on the lower electrode, and an upper electrode formed on the insulating film, the lower electrode being a branch of the corresponding signal line, wherein the step of forming a plurality of nonlinear switching elements includes a step of forming at least one island portion from a same film used for the formation of the upper electrode near the upper electrode, so as to lower an etching rate at a portion of the same film which is to be the upper electrode.

In one embodiment of the invention, the island portion is formed so as to substantially surround the upper electrode.

Alternatively, the method for fabricating a liquid crystal display apparatus including a pair of substrates facing each other and a liquid crystal layer interposed between the pair of substrates includes the steps of: forming a plurality of signal lines and pixel electrodes arranged in rows and columns on at least one of the pair of substrates; and forming a plurality of nonlinear switching elements for connecting each of the plurality of signal lines to a corresponding column of pixel electrodes, each of the switching elements having a lower electrode, an insulating film formed on the lower electrode, and an upper electrode formed on the insulating film, the lower electrode being a branch of the corresponding signal line, wherein the step of forming a plurality of nonlinear switching elements includes a step of forming at least one island portion from a same film used for the formation of the lower electrode near the lower electrode, so as to lower an etching rate at a portion of the same film which is to be the lower electrode.

In one embodiment of the invention, the island portion is formed so as to substantially surround the lower electrode.

Thus, the invention described herein makes possible the advantages of (1) providing a liquid crystal display apparatus free from a variation in the ratio of the capacitance of MIM elements to that of liquid crystal and capable of realizing high-contrast display without an additional fabrication step by improving the size precision of lower electrodes constituting the respective MIM elements, (2) providing a liquid crystal display apparatus free from a variation in the ratio of the capacitance of MIM elements to that of liquid crystal and capable of being fabricated with excellent production yield by improving the size precision of upper electrodes, and (3) providing a method for fabricating such a liquid crystal display apparatus.

These and other advantages of the present invention will become apparent to those skilled in the art upon reading and understanding the following detailed description with reference to the accompanying figures.

DESCRIPTION OF THE PREFERRED EMBODIMENTS

EXAMPLE 1

Figure 1:
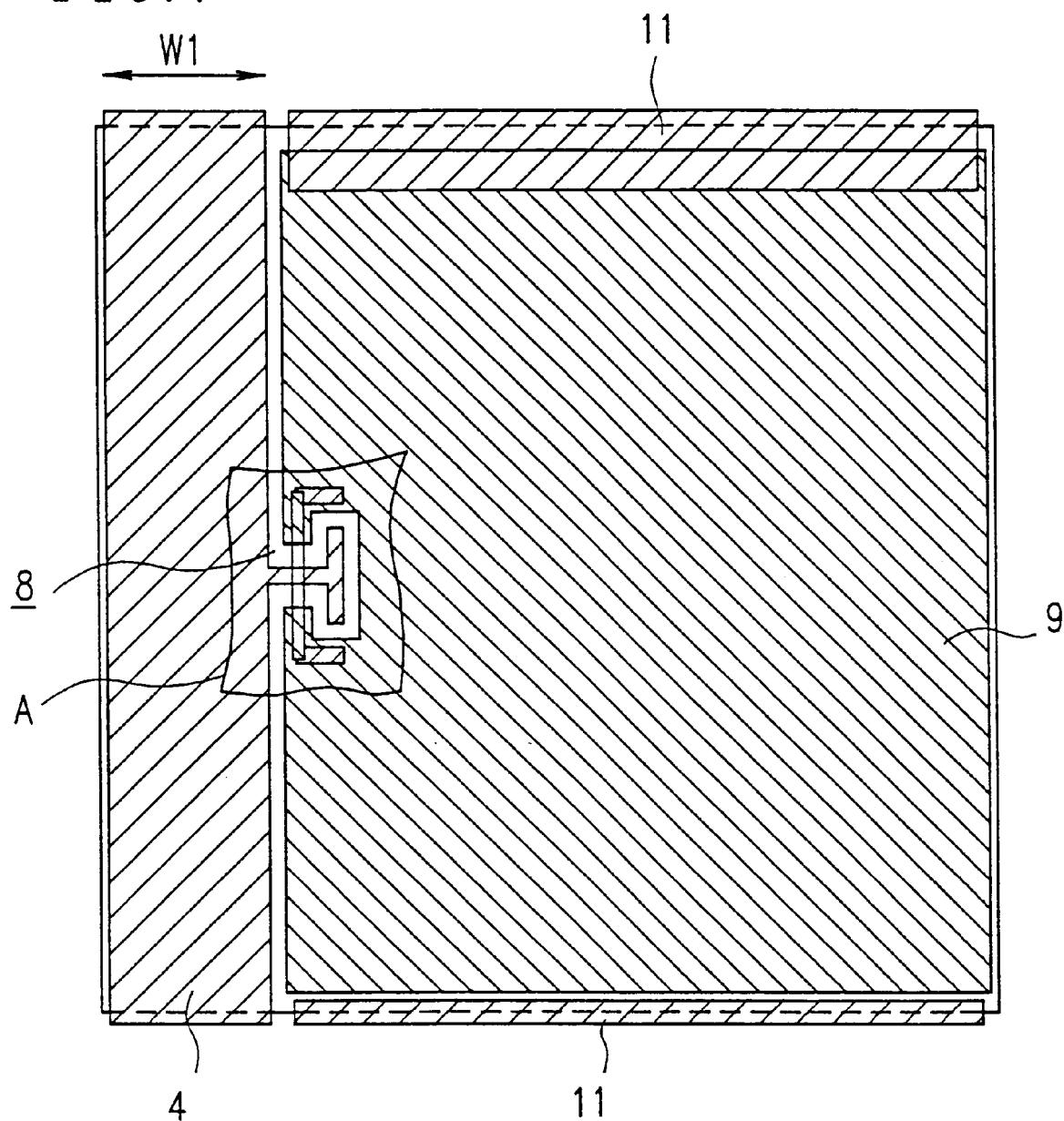
FIG. 1 is a partial plan view of an element-formed substrate of a liquid crystal display apparatus of Example 1 according to the present invention.

A first example of the liquid crystal display apparatus according to the present invention will be described with reference to FIGS. 1 to 6. the liquid crystal display apparatus of Example 1 includes an element-formed substrate 1, a counter substrate 21 opposing the element-formed substrate 1, and a liquid crystal layer 28 interposed between the substrates 1 and 21. The element-formed substrate 1 includes a glass substrate 2, a base coat insulating film 3 formed on the glass substrate 2, signal lines 4 and branches (lower electrodes) 5 of the signal lines 4 formed on the base coat insulating film 3, and insulating films 6 formed to cover the surfaces of the signal lines 4 and the lower electrodes 5. The branches 5 of the signal lines 4 are in a T shape. Upper electrodes 7 are formed sofas to partly cover the insulating films 6. Each portion where the lower electrode 5, the insulating film 6, and the upper electrode 7 overlap one another constitutes a MIM element 8. On each upper electrode 7 is formed the corresponding pixel electrode 9, so that the MIM element 8 is electrically connected to the corresponding pixel electrode 9.

Island portions 10 are also formed on the base coat insulating film 3 near each lower electrode 5, surrounding the T-shaped lower electrode 5, so as to ensure the electrical connection between the lower electrode 5 and the pixel electrode 9. Each end of the upper electrode 7 and the portion of the pixel electrode 9 to be connected to the end of the upper electrode 7 overlap on each island portion 10.

Hereinbelow, an exemplified method for fabricating the element-formed substrate 1 with the above structure will be described. In this example, transparent-type monochrome TN liquid crystal was used with 1280×960 dots and 0.22 mm pixel pitch in the normally white mode. A width w1 of each signal line 4 was 40 $\mu$m, the size of each MIM element 8 was 4 μm×4 μm, and the ratio in the capacitance of the MIM element 8 to that of the liquid crystal was set at approximately 1:10.

First, the base coat insulating film 3 is formed on the glass substrate 2 by DC sputtering and the like. The glass substrate 2 can be made of silica glass, borosilicate glass, or soda-lime glass, for example. In this example, fusion pyrex glass, #7059 manufactured by Corning was used. $Ta_2O_5$ was deposited on the glass substrate 2 to a thickness of 3000 Å to form the base coat insulating film 3.

The base coat insulating film 3 can be omitted. However, with the base coat insulating film 3, a thin film formed thereon can be prevented from being contaminated by impurities in the glass substrate 2, for example, and thus can obtain enhanced characteristics.

A metal thin film which is to be used as the signal lines 4 and the lower electrodes 5 is then formed on the glass substrate 2 by DC sputtering. In this example, Ta was deposited to a thickness of 3000 Å by DC sputtering using a TaN sintered target having a nitrogen concentration of 4.5 mol % and argon (Ar) as a reaction gas. This film formation was performed under the following conditions: an Ar gas flow of 100 sccm, a sputtering gas pressure of 0.4 Pa, a DC power of 2.6 $W/cm^2$, substrate heating to 100° C. for 3 minutes, a substrate conveying speed of 100 mm/min, and a distance between the substrate and the target of 77 mm.

A resist pattern of a predetermined shape is then formed on the thus-formed Ta thin film by photolithography. The Ta thin film is etched according to the pattern, so as to form predetermined shapes of lines for connecting terminals of the resultant liquid crystal display apparatus to an external driving circuit (not shown) and the signal lines 4. The signal lines 4 which are parallel to one another respectively include a plurality of branches 5. A pattern for the island portions 10 is also formed so that the island portions 10 surround the branches (lower electrodes) 5 of the signal lines 4. Thus, the island portions 10 are formed by etching together with the signal lines 4 and the branches 5 thereof. This formation of the island portions 10 near the lower electrodes 5 by etching simultaneously with the formation of the lower electrodes 5 prevents the lower electrodes 5 from deforming, and thus precise patterning of the lower electrodes 5 is possible.

Figure 2:
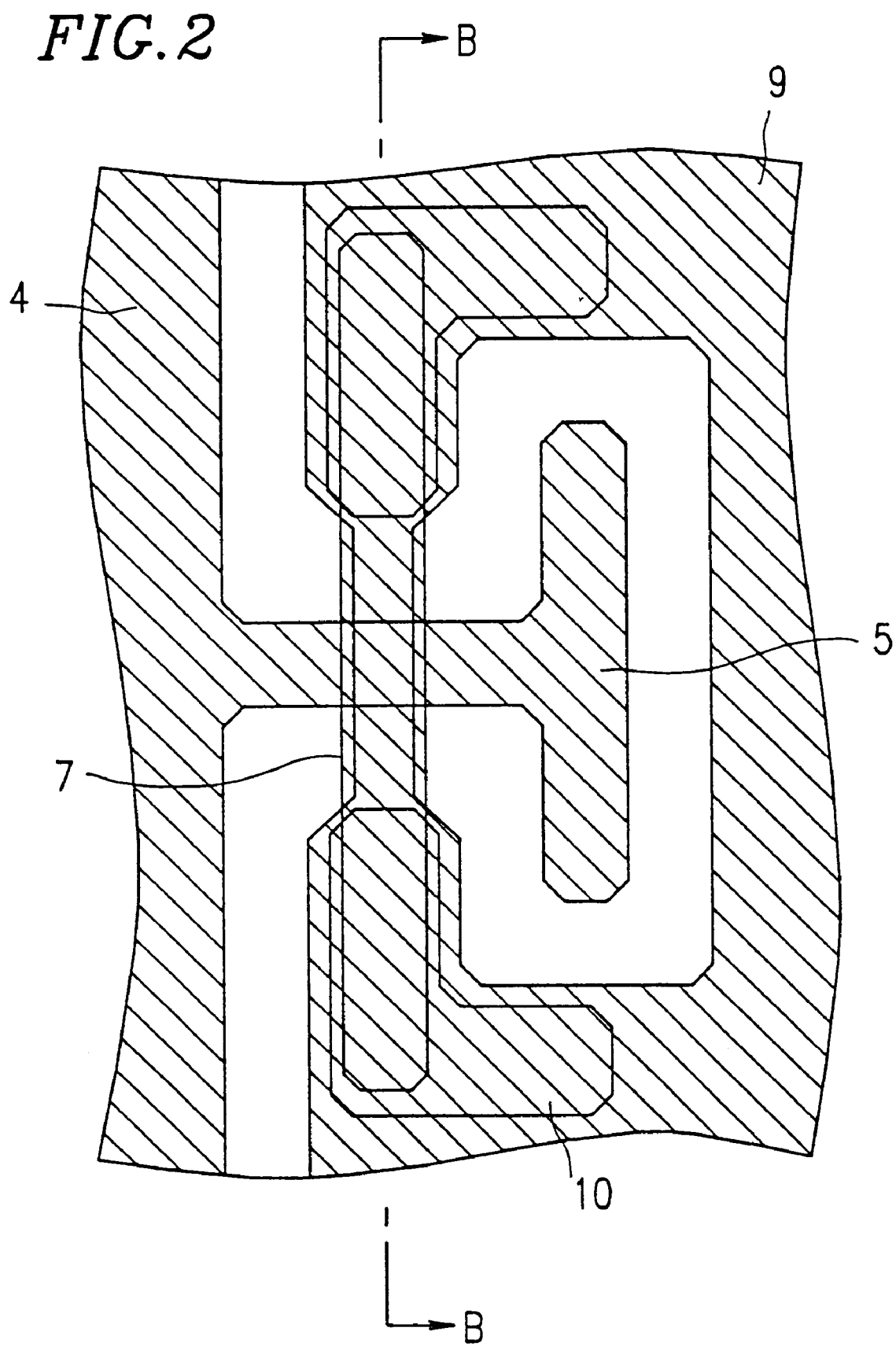
FIG. 2 is an enlarged view of portion A of FIG. 1.

In this example, the resist pattern was formed so that a width w2 of each branch 5 be 4 μm and a distance w3 between the branch 5 and each island portion 10 be 10 μm. The Ta thin film was dry-etched under the following conditions; an RF output of 700 W, a gas flow of 550 sccm ($CF_4$: 462 sccm, $O_2$: 88 sccm), an $O_2$ partial pressure of 16% and a pressure of 450 mTorr. Thus, the signal lines 4 with the width w1 of 40 μm as shown in FIG. 1 and the lower electrodes 5 with the width w2 of 4 μm and the L-shaped island portions 10 located apart from each lower electrode 5 by the distance w3 of about 10 μm as shown in FIG. 2 were formed.

Hereinbelow, the relationship between the shape of the lower electrode 5 and the island portions 10 will be described.

In general, the width of the lower electrodes 5 is as small as several microns or less. For example, the width of the signal lines 4 in a direction shown by the arrow in FIG. 1 is in the range of several tens to several hundred of microns. The width of the lower electrodes 5 is therefore significantly small compared with the width of the signal lines 4. Accordingly, since the signal lines 4 and the lower electrodes 5 are formed in the same photoetching step in this example, the shape of the lower electrodes 5 tends to become largely different from the designed shape.

Since the width of the lower electrodes 5 is smallest among those of components formed from the Ta thin film simultaneously by etching, the etching rate is largest when the portions of the Ta thin film corresponding to the lower electrodes 5 are etched. The etching variation also becomes large in these portions. This etching variation includes a variation due to the etching itself and a variation due to the size of the lower electrodes 5.

The etching rate can differ between the peripheral portion and the central portion of the element-formed substrate 1. This causes the etching variation due to the etching itself. The main cause of this etching variation is that the density of plasma used for the dry etching of the Ta thin film is not uniform on the element-formed substrate 1.

The etching rate also varies depending on the presence of any pattern near the pattern for the lower electrodes 5, and the density and size of the lower electrodes 5. In the case where a positive-type resist is used, a resist pattern is formed to cover the portions of the Ta thin film which are to be remained unetched, and the remaining uncovered portions are etched. The etching rate at this time is higher when the lower electrode 5 is made narrower and when no pattern is formed near the lower electrode 5. In reverse, the etching rate is lower when the lower electrodes 5 are made wider and when a pattern is formed near the lower electrodes 5.

Thus, in this example, as shown in FIG. 2, each lower electrode 5 is in a T shape having a widened end portion, and the island portions 10 are formed near the lower electrode 5. In the dry etching of the Ta thin film into the above pattern, it took 220 seconds to etch the Ta thin film of a thickness of 3300 Å. The etching rate was about 900 Å/min. On the other hand, when the lower electrode 5 has the conventional shape where the width is uniform from the root connecting to the signal line 4 to the end, it took 190 seconds to etch the Ta thin film of a thickness of 3300 Å. The etching rate was about 1000 Å/min. Thus, by forming a pattern such as that described above on the Ta thin film to form the lower electrodes 5, the etching rate can be lowered. This makes it possible to obtain the lower electrodes 5 of a designed shape, and thus improve the size precision of the MIM elements.

The shape of the lower electrodes (branches) 5 is not limited to the T shape. Any other shape can be used as long as it allows the portion of each lower electrode 5 overlapped by the insulating film 6 and the upper electrode 7 to have a uniform width. For example, a shape having a portion extending substantially in parallel with the signal line 4 at a position closer to the end with respect to the portion overlapped by the insulating film 6 and the upper electrode 7, such as the aforementioned T shape, an L shape, and a cross shape, can be used.

The shape of the island portions 10 is not limited to the L shape as shown in FIG. 2. The shape is determined depending on the shape of the lower electrode 5 so that the width w3 of the region to be removed by etching (i.e., the distance between the side of the lower electrode 5 and the opposing side of the island portions 10) can be substantially uniform. The island portions 10 are not necessarily formed to surround the entire lower electrode 5. It is only the portion of the lower electrode 5 to be overlapped by the insulating film 6 and the upper electrode 7 that is required to be strict to a designed size which can be realized by forming the island portions 10 to lower the etching rate. The size precision of the MIM element will not be affected if the size of the portion of the lower electrode 5 farthest from the signal line 4, for example, deviates from a designed size.

Simultaneously, at the formation of the signal lines 4, the branches (lower electrodes) 5, and the island portions 10 by patterning, a light shade film 11 made of Ta is formed on each gap between the adjacent pixel electrodes 9 as shown in FIG. 1. It should be noted that the light shade film 11 are formed so as not to be in contact with the signal lines 4 and the pixel electrodes 9. In this example, a gap of 4 µm was formed between the signal line 4 and the light shade film 11.

In order to achieve high-contrast display, the pixel electrode 9 in one pixel is desirably as large as possible. The optical characteristics of the liquid crystal can not be changed where the pixel electrode 9 is not formed. Light passes through the gap between the pixel electrodes 9, and especially in the normally white mode, this lowers the optical characteristics, such as contrast, of the resultant liquid crystal display apparatus. The pixel electrode 9 is generally composed of a transparent conductive film made of ITO and the like, which is different from the conductor used for wirings. Since the pixel electrode 9 is electrically connected to the corresponding signal line 4 only when the MIM element 8 as a switching element is turned on, the pixel electrode 9 needs to be isolated from the signal line 4. Accordingly, the pixel electrodes 9 need to be arranged with a predetermined gap between the adjacent pixel electrodes 9 in consideration of misalignment. The light shade film 11 is therefore formed on each gap between the adjacent pixel electrodes 9 so as to improve the optical characteristics of the resultant liquid crystal display apparatus.

Subsequently, using a 1% ammonium tartrate solution as an electrolyte, the insulating films 6 are formed by anodizing the surfaces of the signal lines 4 including the branches 5, except for the end portions thereof for connecting to an external circuit. In this example, the anodization was performed under the conditions of a temperature of the electrolyte of about 25° C., a formation voltage of 31 V, and a formation current of about 10 mA/piece. Thus, the insulating films 6 made of $Ta_2O_5$ with a thickness of about 600 Å were obtained.

Figure 3:
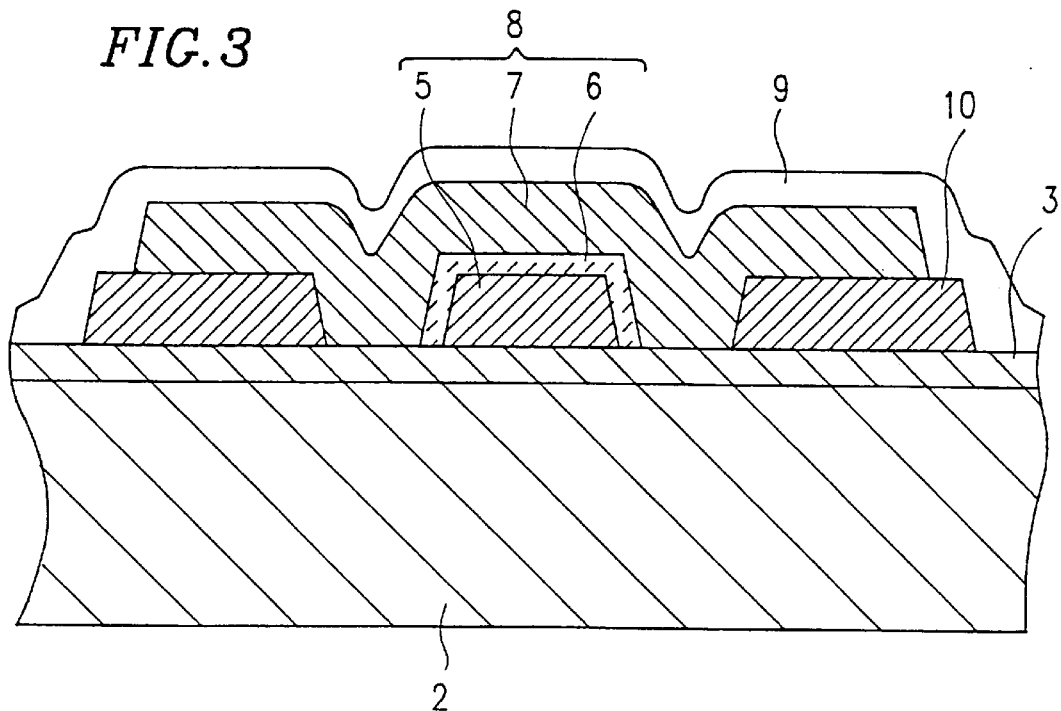
FIG. 3 is a sectional view taken along line B—B of FIG. 2.
Figure 4:
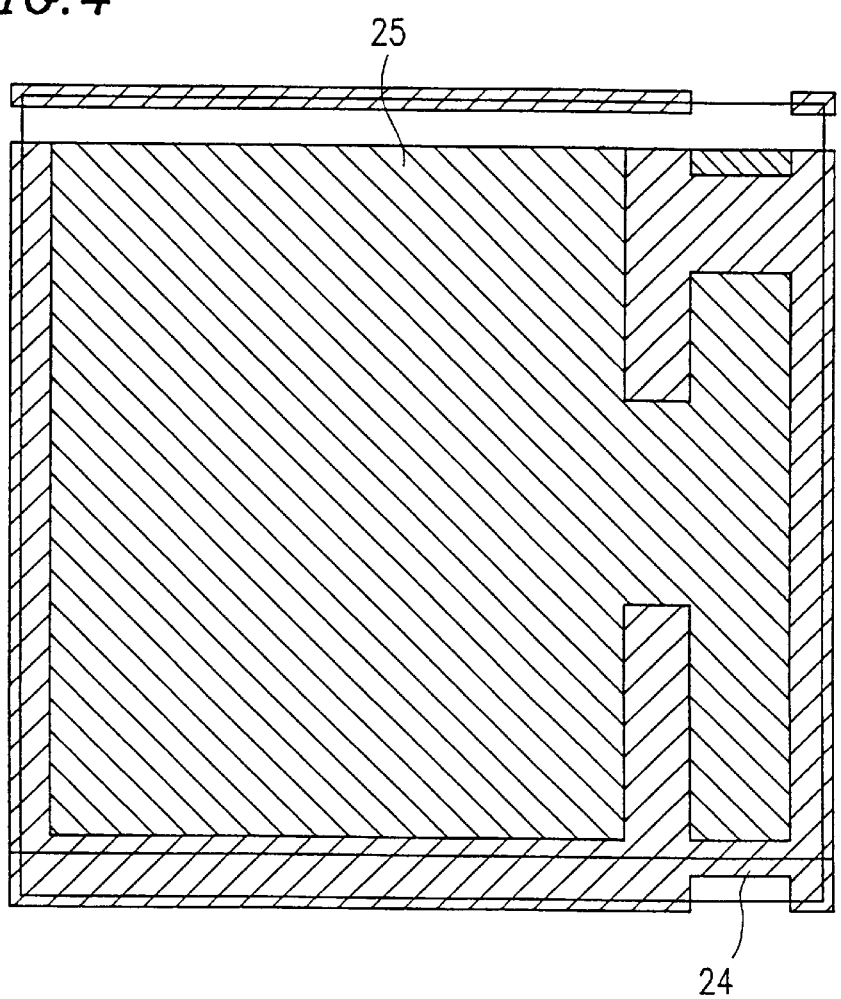
FIG. 4 is a partial plan view of a counter substrate to be bonded with the element-formed substrate shown in FIG. 1.
Figure 5:
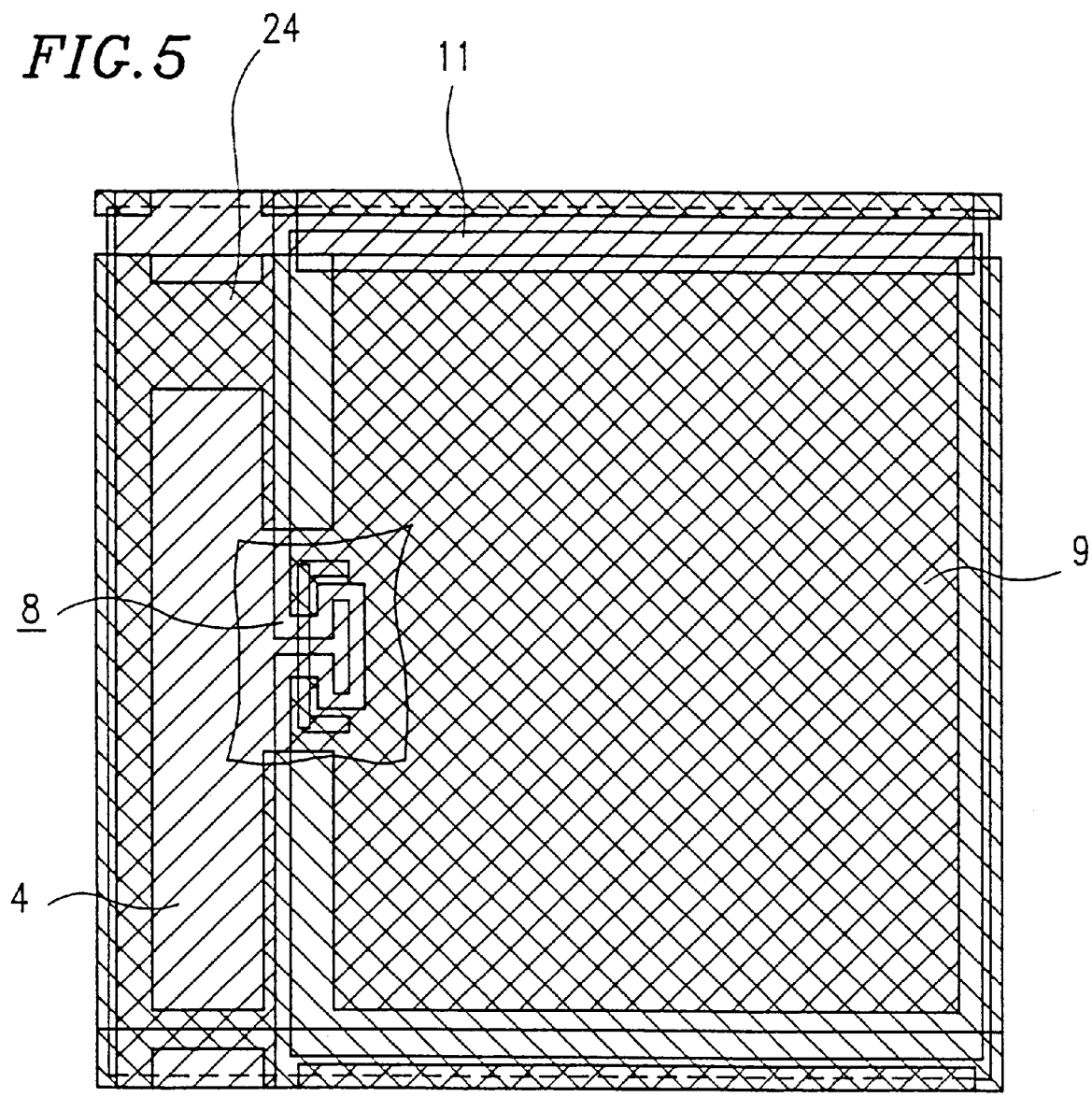
FIG. 5 is a partial plan view of the element-formed substrate shown in FIG. 1 and the counter substrate shown in FIG. 4 when they are bonded together.
Figure 6:
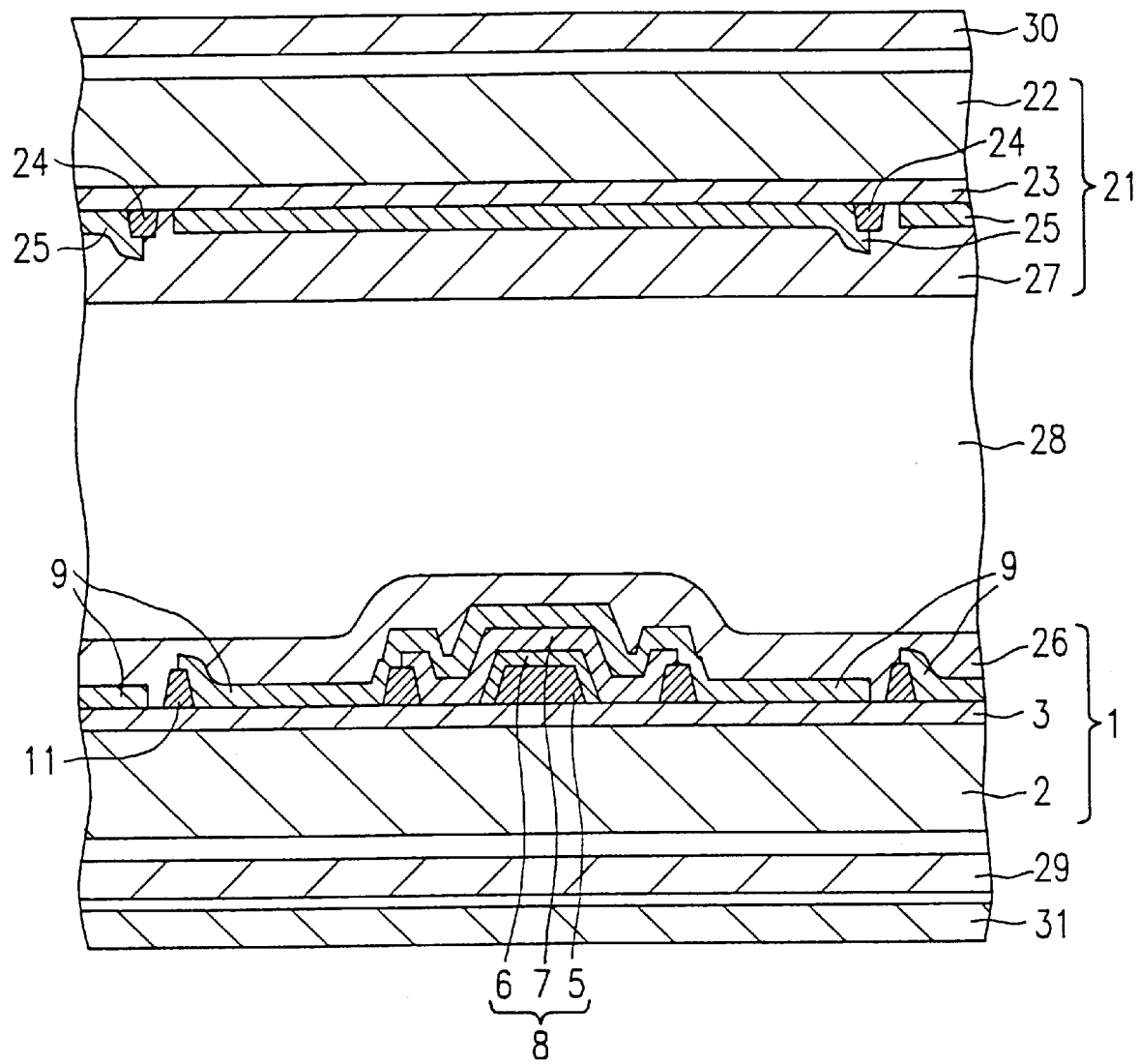
FIG. 6 is a partial sectional view of the liquid crystal display apparatus of Example 1 according to the present invention.

Then, a metal thin film is formed on the glass substrate 2 by sputtering. Ta, Ti, Cr, Al, and the like can be used as the material for the metal thin film. In this example, a Ti thin film of a thickness of 4000 Å was formed. The metal thin film is then patterned to form the upper electrodes 7 each of which extends over the lower electrode 5 and the insulating film 6 and has both ends located on the island portions 10 as shown in FIG. 3. Then, a transparent conductive film made of ITO, for example, is formed on the upper electrodes 7 and patterned to form the pixel electrodes 9 each of which is partly in direct contact with the island portions 10 as shown in FIG. 3. The element-formed substrate 1 is thus fabricated.

Then, the fabrication of the counter substrate 21 will be described. First, a base coat insulating film 23 is formed on a glass substrate 22. Light shade films 24 composed of metal thin films are then formed on the base coat insulating film 23. The materials for the glass substrate 2 and the base coat insulating film 3 mentioned above can also be used for the glass substrate 22 and the base coat insulating film 23, respectively. The light shade films 24 are formed in the regions where the MIM elements 8 and the signal lines 4 are formed and the regions where the pixel electrodes 9 are not formed, which have not been covered with the light shade films 11 made of Ta formed on the element-formed substrate 1.

Each overlap portion of the light shade film 24 and the signal line 4 found when the element-formed substrate 1 and the counter substrate 21 are bonded together is as narrow as possible, preferably 10 µm or less. This is because, when a conductive foreign matter enters between the bonded substrates 1 and 21, a leak may occur between the substrates due to the overlap of the light shade film 24 and the signal line 4. In this example, in consideration of the precision of the bonding of the substrates 1 and 21, the light shade film 24 was formed so that the overlap with the signal lines 4 is 5 µm.

Since the light shade films 24 are made of metal, they can also serve as auxiliary lines for lowering the electric resistance of counter electrodes 25 to be described later if they are electrically connected to one another.

Thereafter, a transparent conductive film made of ITO and the like is formed on the counter substrate 21 and patterned into a stripe shape to form the counter electrodes 25. In this example, ITO was deposited to a thickness of 1000 Å and patterned to form the counter electrodes 25 at a pitch of 0.22 mm. Incidentally, color filter layers can additionally be formed on the respective counter electrodes 25 for effecting color display. The counter substrate 21 is thus fabricated.

Alignment films 26 and 27 are formed on the thus obtained element-formed substrate 1 and the counter substrate 21, respectively. In this example, the alignment films 26 and 27 were formed of polyimide film by sintering at a temperature of about 200° C. After the sintering, the alignment films 26 and 27 are rubbed so that 90° twisting of liquid crystal molecules is obtained between the substrates.

Subsequently, a thermosetting sealant is applied to one of the substrates 1 and 21, while spacers are dispersed on the other substrate. The substrates 1 and 21 are then bonded together so that the alignment films 26 and 27 face each other and the signal lines 4 cross the counter electrodes 25 substantially at right angles, and then pressed together while heating at about 150 to 200° C. Then, liquid crystal 28 is injected into a space formed between the substrates 1 and 21 and sealed, thus to complete a liquid crystal cell. 98.1% of the light incident on the portions of the liquid crystal cell where the pixel electrodes 9 are not formed is blocked by the light shade films 11 of the element-formed substrate 1 and the light shade films 24 of the counter substrate 21. Transparent-type polarizers 29 and 30 with a simplex transmittance of 44.5% and a degree of polarization of 96.5% are then disposed on the back and front surfaces of the liquid crystal cell, respectively, so as to provide an opto-electric characteristic. Thus, the liquid crystal display apparatus is completed. An aluminum reflector 31 can additionally be formed on the back surface of the liquid crystal cell to form a reflection-type liquid crystal display apparatus.

In the thus-fabricated liquid crystal display apparatus of this example, the lower electrodes 5 which determine the characteristics of the MIM elements can be formed with high precision. This makes it possible to obtain the MIM elements with substantially the same shape and thus with substantially the same characteristics over the display plane of the liquid crystal display apparatus, realizing uniform display over the display plane. Further, in the liquid crystal display apparatus of this example, the aperture ratio was 68.9%, and the area of the gaps between the pixel electrodes 9 which allow light from a backlight source to leak therethrough was 1.2% of the whole area of the display plane. Conventionally, the latter was 13%. Thus, the area allowing light to leak therethrough is reduced, resulting in increasing the light use efficiency and enhancing the contrast by about 10%.

Further, in this example, the ends of each upper electrode 7 are located on the island portions 10 made of the same material as the lower electrode 5. Each pixel electrode 9 is also partly in direct contact with the island portions 10.

Thus, good ohmic contact can be realized between the pixel electrode 9 and the lower electrode 5, improving the positive-negative symmetry of the I-V characteristic of the MIM element. The island portions 10 of the liquid crystal display apparatus of this example are therefore helpful not only in fabricating the MIM elements of a designed size but also in improving the characteristic of the MIM elements.

As described above, in the liquid crystal display apparatus of Example 1, each lower electrode has a portion of which width is larger than that of the portion overlapped by the insulating film and the upper electrode at a position closer to the end thereof with respect to the overlap portion. With this formation of the widened portion, the etching rate at which the lower electrodes are formed by etching a metal thin film can be lowered. With the lowered etching rate, the lower electrodes with a size substantially equal to a designed size. This can solve the conventional problems where an error arises in the ratio of capacitance of the MIM elements to that of the liquid crystal due to a variation in the size of the lower electrodes and thus the MIM elements, resulting in generating display variation and reducing production yield.

The island portions are formed near the lower electrodes together with the formation of the signal lines and the lower electrodes by patterning the same film. The island portions are helpful in further lowering the etching rate at the portions which are to be the lower electrodes. Thus the size precision of the lower electrodes can be further improved. The portions of the pixel electrodes which are connected to the ends of the upper electrodes are in direct contact with the island portions. This realizes good ohmic contact between the lower electrodes and the pixel electrodes.

The light shade films for blocking light from leaking through the gaps between the pixel electrodes are also formed on the element-formed substrate together with the formation of the signal lines by patterning the same film. Therefore, the optical characteristics of the resultant liquid crystal display apparatus can be improved without increasing the number of fabrication steps, and high-contrast display can be realized. The light shade films are also formed on the counter substrate at positions corresponding to the gaps between the pixel electrodes when the element-formed substrate and the counter substrate are bonded together. This further improves the optical characteristics of the liquid crystal display apparatus. The width of each overlap portion of the light shade film and the signal line is made 10 $\mu$m or less in consideration of an error at the bonding of the two substrates. The current leak which might occur when a conductive foreign substance enters between the two substrates due to the overlap of the light shade film and the pixel electrode can be therefore significantly reduced. The light shade films of the counter substrate can serve as auxiliary lines for the counter electrodes if they are electrically connected to one another. This makes it possible to reduce the resistance.

EXAMPLE 2

A second example of the liquid crystal display apparatus according to the present invention will be described with reference to FIGS. 7 to 10. The same components as those of Example 1 are denoted by the same reference numerals shown in FIGS. 1 to 6.

Figure 7:
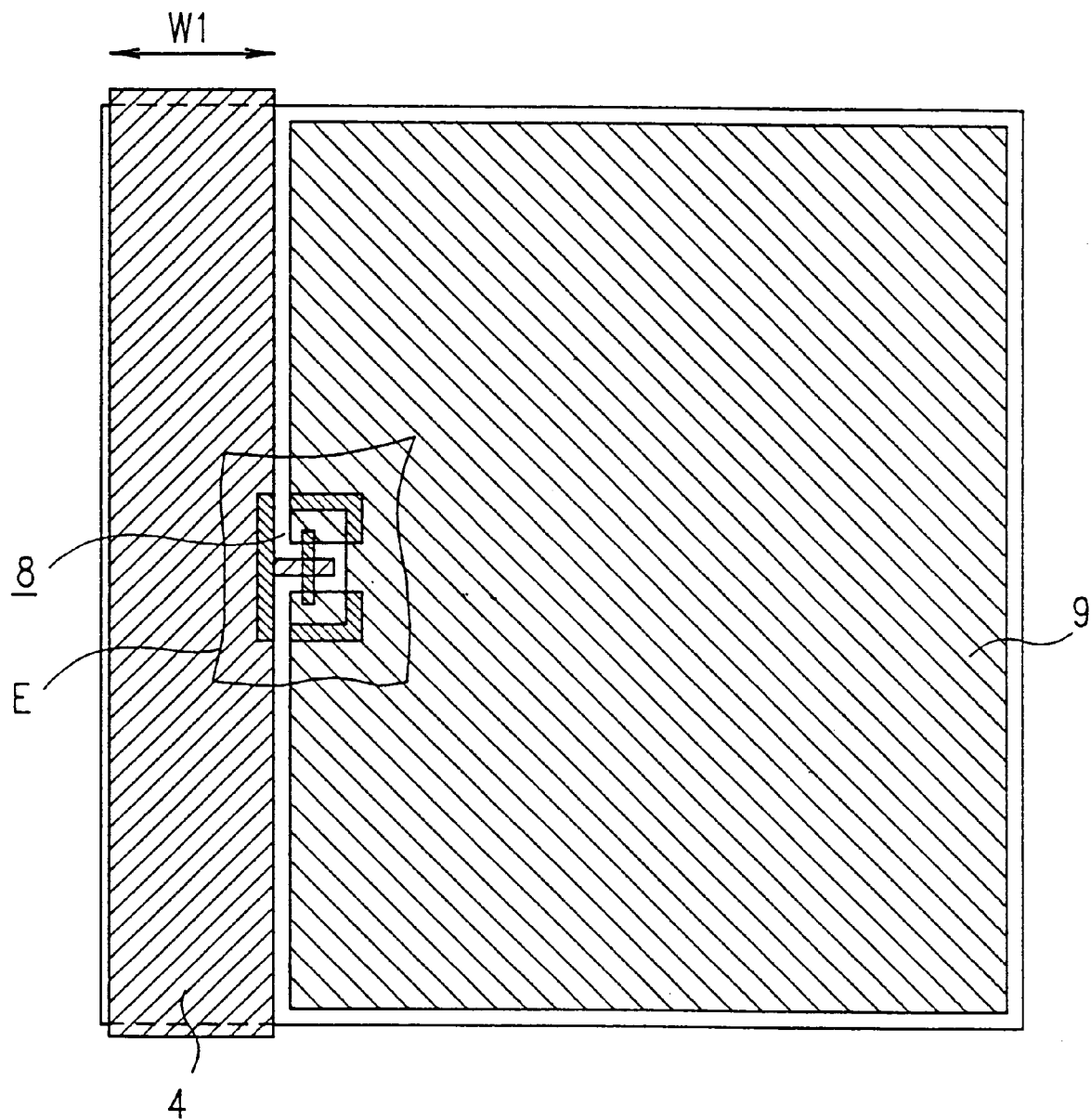
FIG. 7 is a partial plan view of a liquid crystal display apparatus of Example 2 according to the present invention.
Figure 8:
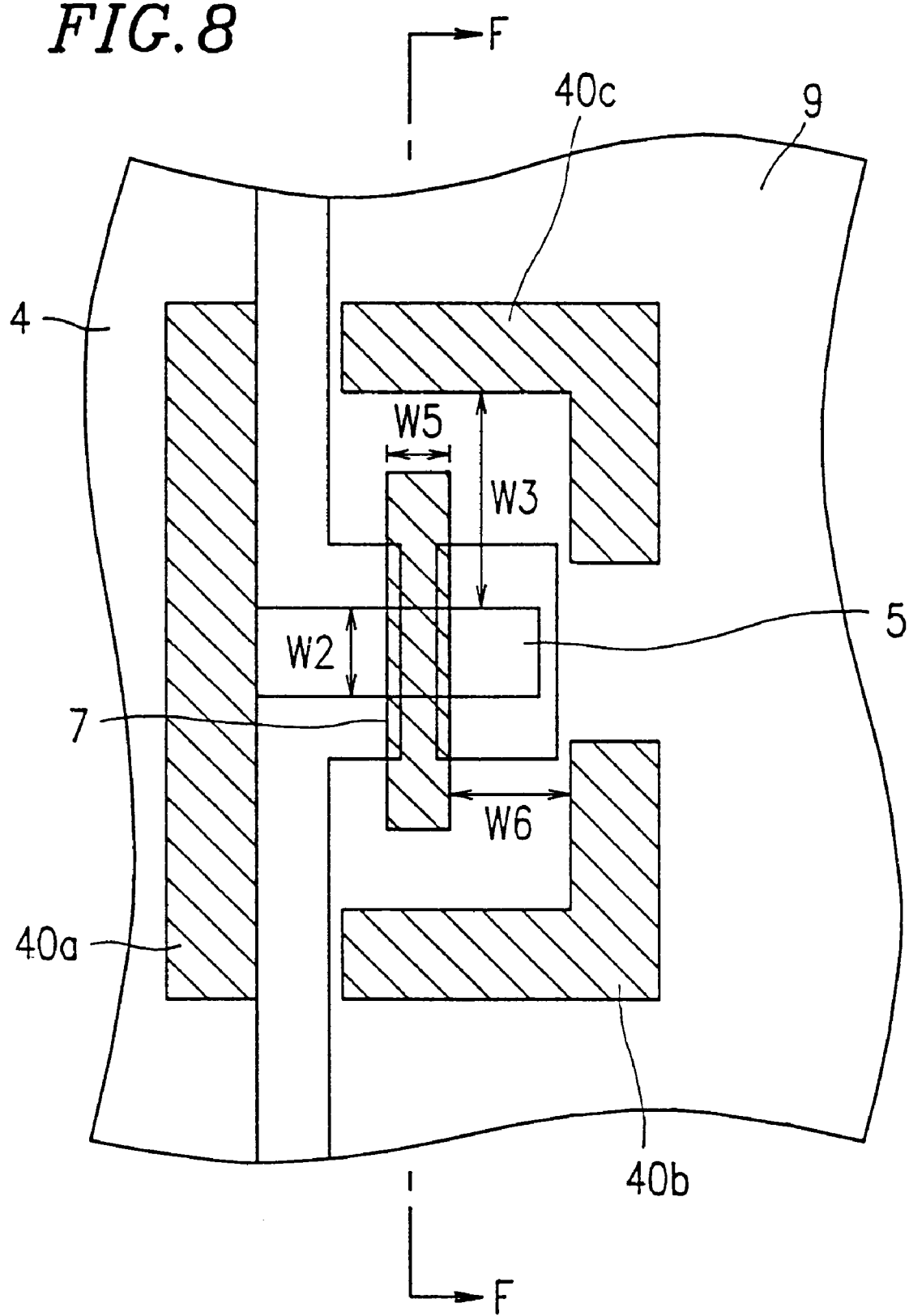
FIG. 8 is an enlarged view of portion E of FIG. 7.
Figure 9:
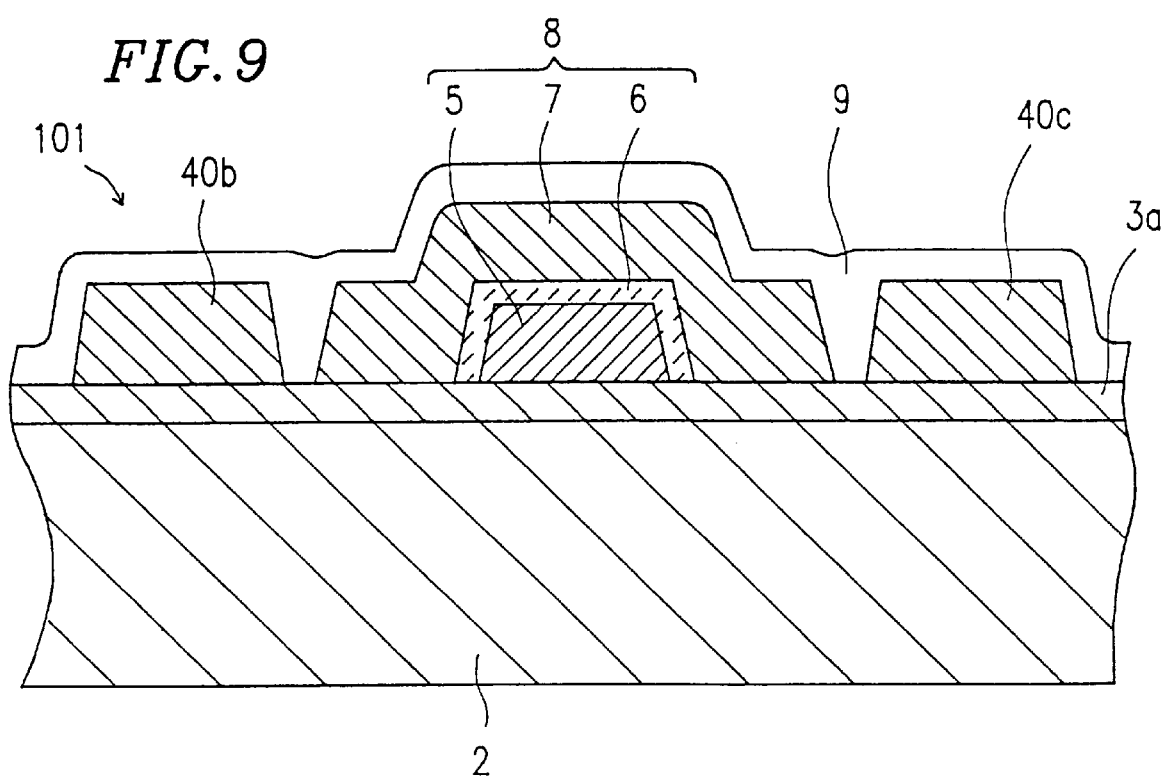
FIG. 9 is a sectional view taken along line F—F of FIG. 8.

An element-formed substrate 101 includes a glass substrate 2, a base coat insulating film 3 formed on the glass substrate 2, signal lines 4 and branches (lower electrodes) 5 of the signal lines 4 formed on the base coat insulating film 3, and insulating films 6 formed to cover the surfaces of the signal lines 4 and the lower electrodes 5. The signal lines 4 are formed in a stripe shape. The width of each lower electrode 5 is substantially uniform from the root connecting to the signal line 4 to the end thereof. Upper electrodes 7 are formed so that a portion of each upper electrode 7 overlap the lower electrode 5 and the insulating film 6 as shown in FIG. 8. The upper electrode 7 is connected to each of pixel electrodes 9 arranged in rows and columns. As shown in FIGS. 7 and 8, island portions 40a, 40b, and 40c are formed on the base coat insulating film 3 near the upper electrode 7 so as to surround the upper electrode 7.

Hereinbelow, an exemplified method for fabricating the element-formed substrate 101 with the above structure will be described. In this example, transparent-type monochrome TN liquid crystal was used with 1280×960 dots and a pixel pitch of 0.22 mm in the normally white mode. The width of each signal line 4 was 40 $\mu$m, the size of each MIM element 8 was 4 $\mu$m×4 $\mu$m, and the ratio of the capacitance of the MIM element 8 to that of the liquid crystal was set at approximately 1:10.

First, the base coat insulating film 3 is formed on the glass substrate 2 as described in Example 1, and a metal thin film used for the formation of the signal lines 4 and the lower electrodes 5 is formed on the base coat insulating film 3. In this example, fusion pyrex glass, #7059 manufactured by Corning was used as the glass substrate 2. $Ta_2O_5$ was deposited on the glass substrate 2 to a thickness of 3000 Å to form the base coat insulating film 3. Ta was then deposited on the base coat insulating film 3 to a thickness of 3000 Å by DC sputtering using a TaN sintered target having a nitrogen concentration of 2 to 10 mol % and Ar as a reaction gas. This film formation was performed under the following conditions: an Ar gas flow of 100 sccm, a sputtering gas pressure of 0.4 Pa, a DC power of 2.6 W/cm$^2$, substrate heating to 100° C. for 3 minutes, a substrate conveying speed of 100 mm/min, and a distance between the substrate and the target of 77 mm.

The metal thin film is then patterned by photoetching to form lines for connecting terminals of the resultant liquid crystal display apparatus to an external driving circuit (not shown) and the signal lines 4 each having a plurality of branches 5. In this example, the Ta thin film was dry-etched under the following conditions: an RF output of 700 W, a gas flow of 550 sccm ($CF_4$: 462 sccm, $O_2$: 88 sccm), an $O_2$ partial pressure of 16%, and a pressure of 450 mTorr. Thus, the signal lines 4 with a width w1 of 40 $\mu$m as shown in FIG. 7 and the lower electrodes with a width w2 of 4 $\mu$m as shown in FIG. 8 were formed.

Subsequently, the insulating films 6 are formed by anodizing the surfaces of the signal lines 4 including the branches 5, except for the end portions thereof for connecting to an external driving circuit and the surfaces of the lower electrodes 5. In this example, the insulating films 6 made of $Ta_2O_5$ with a thickness of 600 Å were obtained under the conditions described in Example 1.

Then, a metal thin film used for the formation of the upper electrodes 7 is formed on the glass substrate 2 by sputtering. In this example, a Ti thin film with a thickness of 4000 Å was formed. Al, Cr, and the like can be used for the upper electrodes 7, instead of Ti. However, when Al is used, the positive-negative symmetry of the I-V characteristic of the MIM elements is inferior and thus the contrast lowers, compared with when Ti is used. When Cr is used, a harmful ionic substance such as hexavalent chromium is generated at the etching. This requires additional steps and facilities for treating such a harmful substance, resulting in cost increase. Ti is therefore preferable as the material of the upper electrodes 7.

Thereafter, a resist pattern is formed on the thus-formed Ti thin film by photolithography. Using the resist pattern, the upper electrodes 7 with a uniform width w5 shown in FIG. 8 are formed by patterning the thin film. Resist patterns for the island portions 40a, 40b, and 40c are also formed on the Ti thin film so that the island portions 40a, 40b, and 40c surround each upper electrode 7. Then, the upper electrodes 7 and the island portions 40a, 40b, and 40c are simultaneously formed by wet-etching the Ti thin film. This makes it possible to form the upper electrodes 7 with high precision.

In this example, the resist pattern for the upper electrodes 7 was formed so that the width w5 of the upper electrodes 7 shown in FIG. 8 be 4 µm. The resist pattern for the island portions 40a was formed so that the island portions 40a be in a linear shape substantially parallel to the upper electrodes 7. The resist patterns for the island portions 40b and 40c are formed in an L shape respectively so that the three sides of each upper electrode 7 except for the side opposing the island portion 40a be surrounded by the island portions 40b and 40c. A distance w6 between the side of each of the island portions 40a, 40b, and 40c and the side of the upper electrode 7 in the direction of the width of the signal line 4 was set at 10 µm. In the wet etching of the Ti thin film, an etchant composed of a mixture of hydrofluoric acid and nitric acid (2 L), ammonium persulfate (5 kg), and water (60 L) with a temperature of 35° C. was used.

By forming the island portions 40a, 40b, and 40c of the above shapes, the upper electrodes 7 with a size substantially equal to a designed size can be formed. This is because, as described in Example 1, the etching rate varies depending on the presence of any pattern near the upper electrodes 7, i.e., the density of a resist pattern near the upper electrodes 7, and the controllability of the size of the upper electrodes 7 varies depending on the etching rate.

For example, when the island portions 40a, 40b, and 40c were to be formed near each upper electrode 7 to surround the upper electrode 7 as shown in FIG. 8, it took 125 seconds to wet-etch the Ti thin film with a thickness of 3400 Å. The etching rate was about 1600 Å/min. On the other hand, when only the upper electrodes 7 were to be formed by wet-etching the Ti thin film with the same thickness as in a conventional manner without forming island portions, it took 100 seconds to etch the Ta thin film. The etching rate was about 2000 Å/min. Thus, by patterning the Ti thin film to form the upper electrodes 7, the island portions 40a, 40b, and 40c of the shapes as shown in FIG. 8, the etching rate can be lowered at any position on the element-formed substrate 101. This makes it possible to obtain the upper electrodes 7 with a size substantially equal to a designed shape, preventing the Ti thin film from being over-etched, and thus improve the size precision of the MIM elements.

The shape of the island portions is not limited to those shown in FIGS. 7 and 8. It is determined depending on the shape of the upper electrodes 7 as long as the patterning density in the area near each upper electrode 7 is made high and the width w6 of the region between the upper electrode 7 and each of the island portions 40a, 40b, and 40c to be removed by the etching is substantially uniform.

Thereafter, a transparent conductive film made of ITO and the like is formed covering the island portions 40a, 40b, and 40c, and then patterned to form the pixel electrodes 9 arranged in rows and columns. Thus, the element-formed substrate 101 is fabricated.

Then, the fabrication of the Counter substrate 121 will be described. First, a base coat insulating film 23 and a transparent conductive film made of ITO and the like are formed on a glass substrate 22 in this order. The transparent conductive film is then patterned to form counter electrodes 25 in a stripe shape. In this example, ITO was deposited to a thickness of 1000 Å and then patterned to form the counter electrodes 25 at a pitch of 0.22 mm. Incidentally, color filter layers can additionally be formed on the respective counter electrodes 25 for effecting color display.

Figure 10:
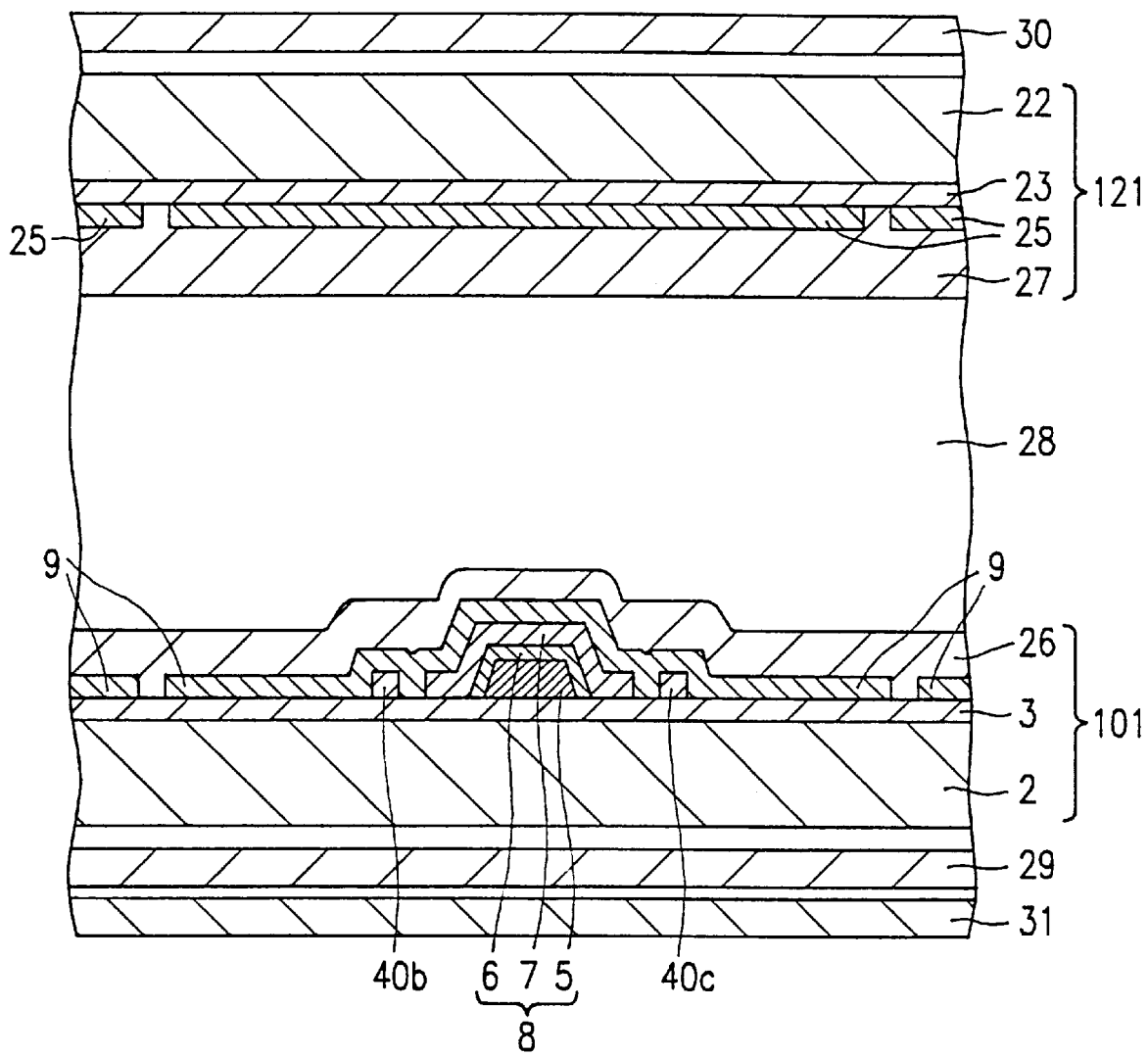
FIG. 10 is a partial sectional view of the liquid crystal display apparatus of Example 2 according to the present invention.

Alignment films 26 and 27 are formed on the thus obtained element-formed substrate 101 and the counter substrate 121, respectively, as shown in FIG. 10. In this example, the alignment films 26 and 27 made of polyimide were formed by sintering at a temperature of about 200° C. The alignment films 26 and 27 are then rubbed so that 90° twisting of liquid crystal molecules be obtained between the substrates when the substrates are bonded together.

Subsequently, a thermosetting sealant is applied to one of the substrates 101 and 121, while spacers are dispersed on the other substrate. The substrates 101 and 121 are then bonded together so that the alignment films 26 and 27 face each other and the signal lines 4 cross the counter electrodes 25 substantially at right angles, and then pressed together while heating at about 150 to 200° C. Then, liquid crystal 28 is injected into a space formed between the substrates 101 and 121 and sealed, thus to complete a liquid cell.

Transparent-type polarizers 29 and 30 with a simplex transmittance of 44.5% and a degree of polarization of 96.5% are then disposed on the front and back surfaces of the liquid crystal cell. Thus, the liquid crystal display apparatus is completed. A reflector 31 made of Al or Ag can additionally be formed on the back surface of the liquid crystal cell, or a polarizer with a reflector attached thereto can be formed instead of the polarizer 29, so as to form a reflection-type liquid crystal display apparatus as shown in FIG. 10.

Thus, in the liquid crystal display apparatus of this example, the pattern density in the area near the upper electrode 7 constituting each MIM element 8 is made high by forming the island portions. This makes it possible to form the upper electrodes 7 of a size substantially equal to a designed size with high precision, preventing a variation in the capacitance of the MIM elements. Thus, uniform display without display variation over the entire display plane was obtained.

EXAMPLE 3

A third example of the liquid crystal display apparatus according to the present invention will be described with reference to FIG. 11.

Figure 11:
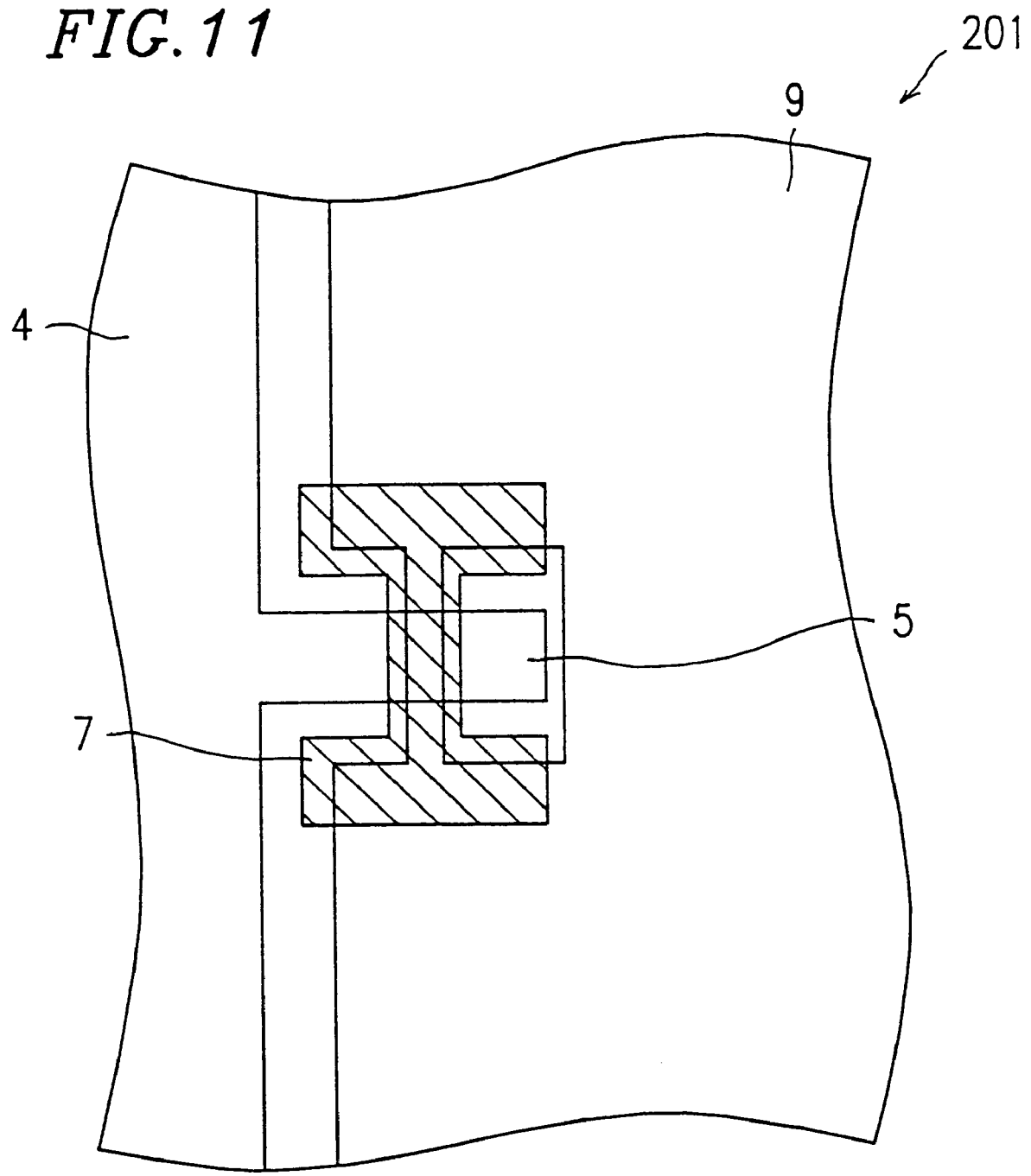
FIG. 11 is a partial enlarged view of a liquid crystal display apparatus of Example 3 according to the present invention.

FIG. 11 is a partial plan view of the portion of an element-formed substrate 201 of this example corresponding to one pixel. The liquid crystal display apparatus of this example has the same structure as the liquid crystal display apparatus of Example 2 except that the shape of upper electrodes 7 is different and no island portions are formed near the upper electrodes 7. The liquid crystal display apparatus of this example is therefore fabricated by the same method as that described in Example 2 except for using a resist pattern of a different shape in the step of forming the upper electrodes 7.

In this example, each upper electrode 7 is in an "I" shape where the width of both ends of the upper electrode 7 is larger than that of the portion thereof overlapping a lower electrode 5 and an insulating film 6. With the widened ends, the portion of the upper electrode 7 overlapping the lower electrode 5 and the insulating film 6 is prevented from being over-etched even if over-etching proceeds from the corners thereof, and thus has a size substantially equal to a designed size. Accordingly, as in the case where island portions are formed near the upper electrodes 7, the size precision of MIM elements 8 can be improved, preventing a variation in the capacitance of the MIM elements 8. As a result, uniform display without display variation over the entire display plane can be obtained.

EXAMPLE 4

A fourth example of the liquid crystal display apparatus according to the present invention will be described with reference to FIG. 12.

Figure 12:
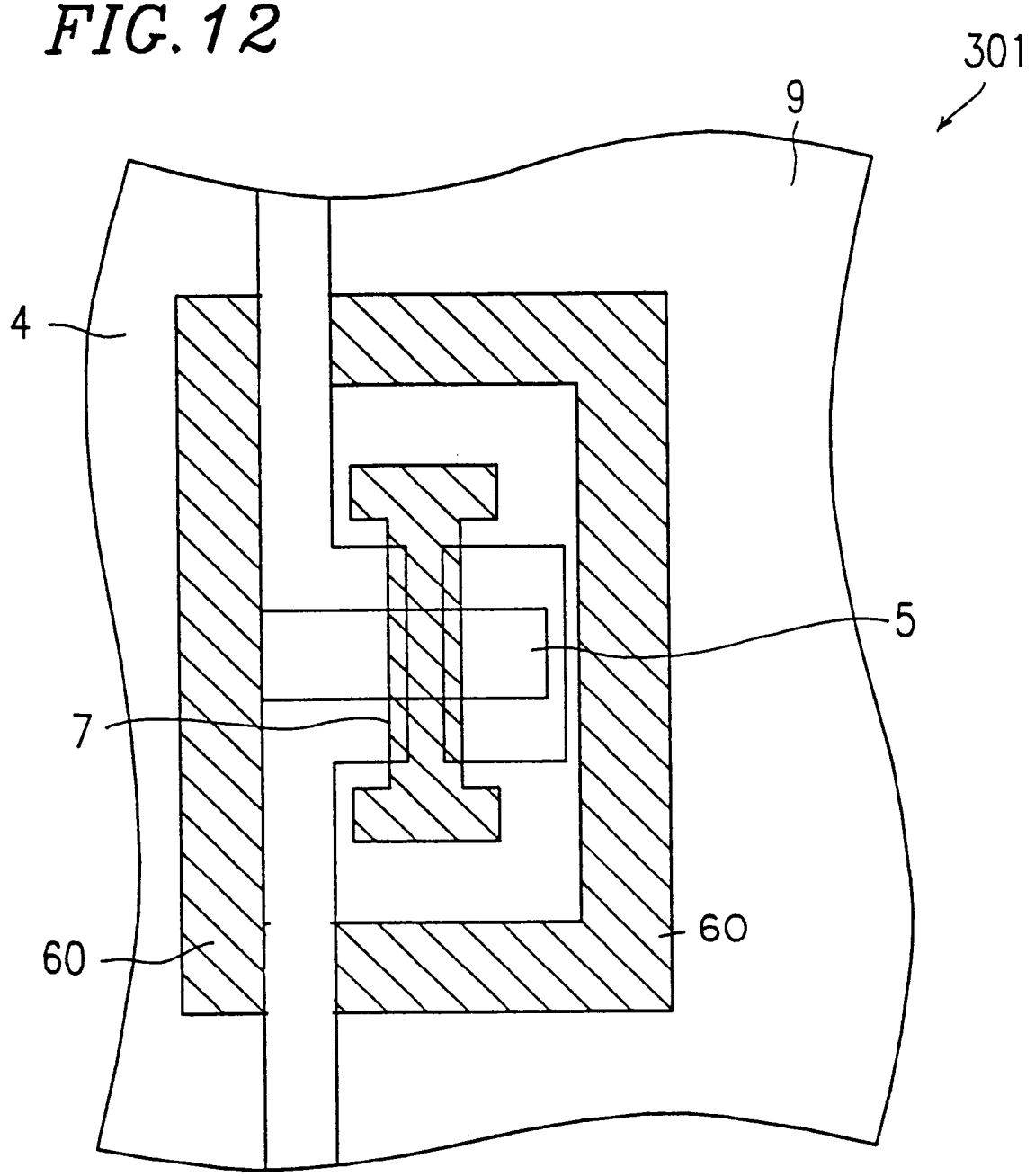
FIG. 12 is a partial enlarged view of a liquid crystal display apparatus of Example 4 according to the present invention.

FIG. 12 is a partial plan view of the portion of an element-formed substrate 301 of this example corresponding to one pixel. The liquid crystal display apparatus of this example has the same structure as the liquid crystal display apparatus of Example 2 except that the shapes of upper electrodes 7 and island portions are different. The liquid crystal display apparatus of this example is therefore fabricated by the same method as that described in Example 2 except for using a resist pattern of a different shape in the step of forming the upper electrodes 7.

In this example, each upper electrode 7 is in an "I" shape as in Example 3 where the width of both ends of the upper electrode 7 is larger than that of the portion thereof overlapping a lower electrode 5 and an insulating film 6. Additionally, an island portion 60 is formed surrounding the upper electrode 7. With the widened ends of the upper electrode 7 and the formation of the island portion 60, the portion of the upper electrode 7 overlapping the lower electrode 5 and the insulating film 6 is prevented from being over-etched even if over-etching proceeds from the corners thereof, and the pattern density in the area near the resist pattern for the upper electrode 7 can be increased as described in Example 2. Thus, the size precision of the upper electrodes 7 can be improved, preventing a variation in the capacitance of MIM elements 8. As a result, uniform display without display variation over the entire display plane can be obtained.

Figure 13A:
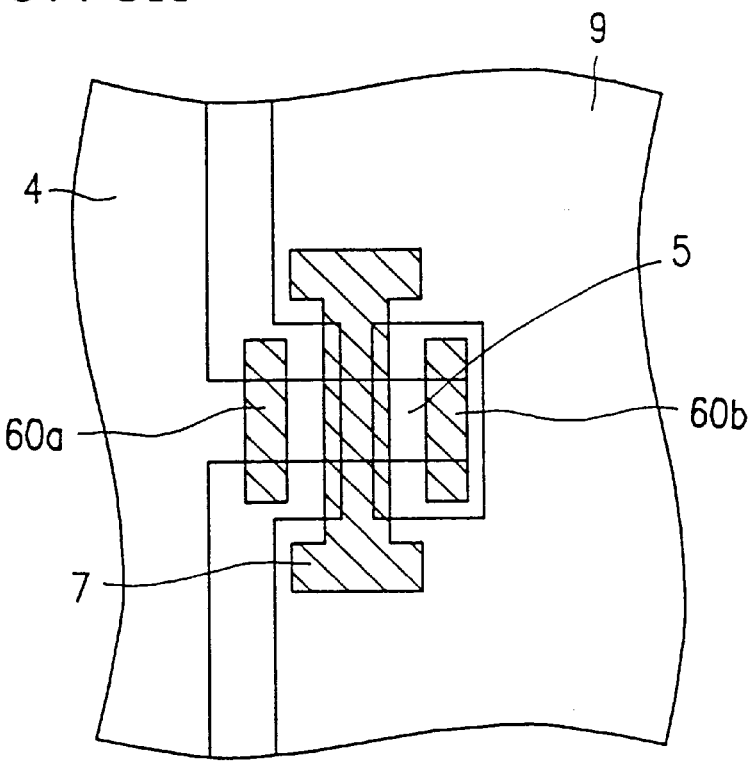
FIGS. 13A and 13B are partial enlarged views of element-formed substrates of alternative examples according to the present invention.
Figure 13B:
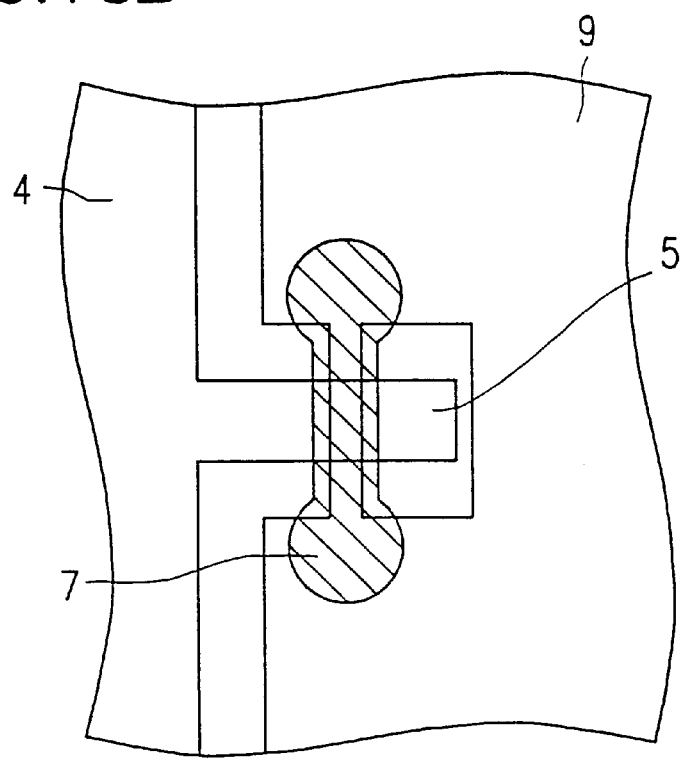
Figure 14:
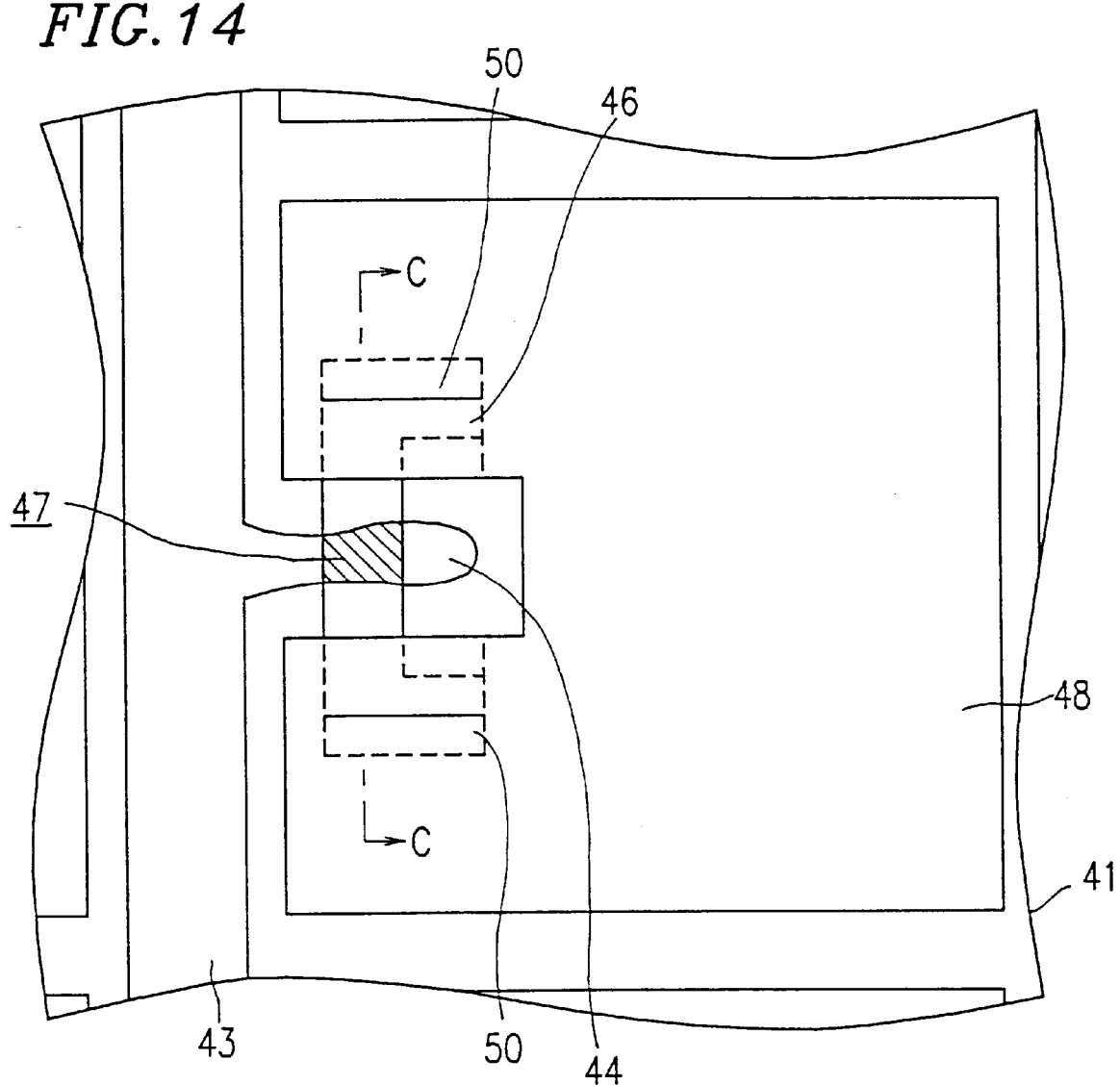
FIG. 14 is a partial plan view of an element-formed substrate of a conventional liquid crystal display apparatus.
Figure 15:
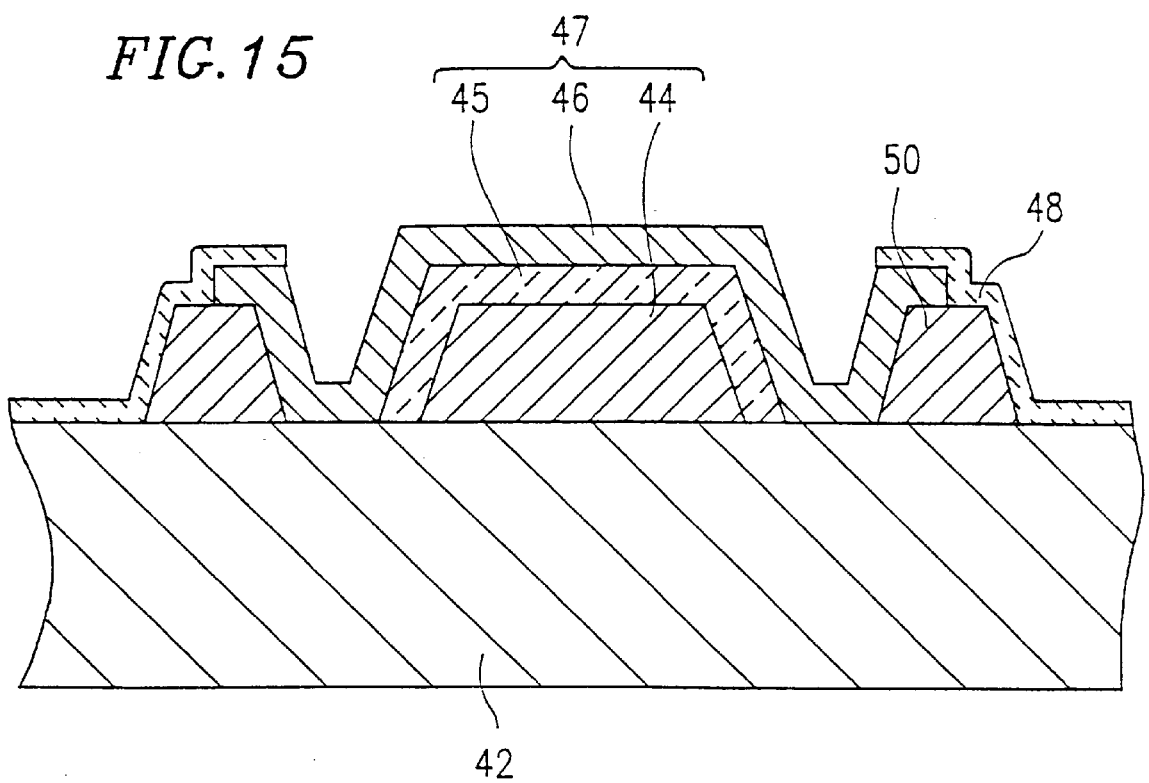
FIG. 15 is a sectional view taken along line C—C of FIG. 14.
Figure 16:
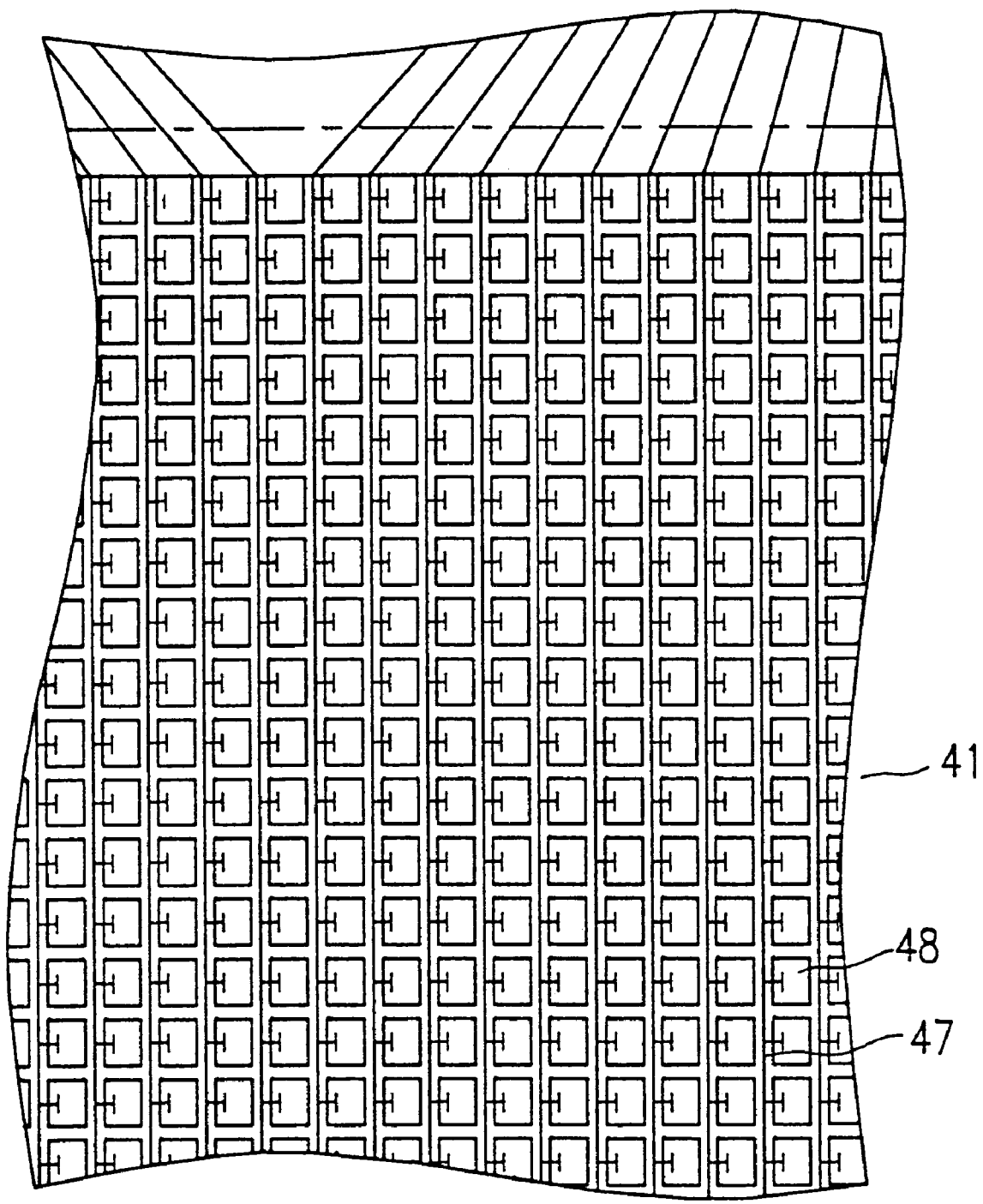
FIG. 16 is a partial enlarged plan view of a display pixel portion of the conventional element-formed substrate.
Figure 17:
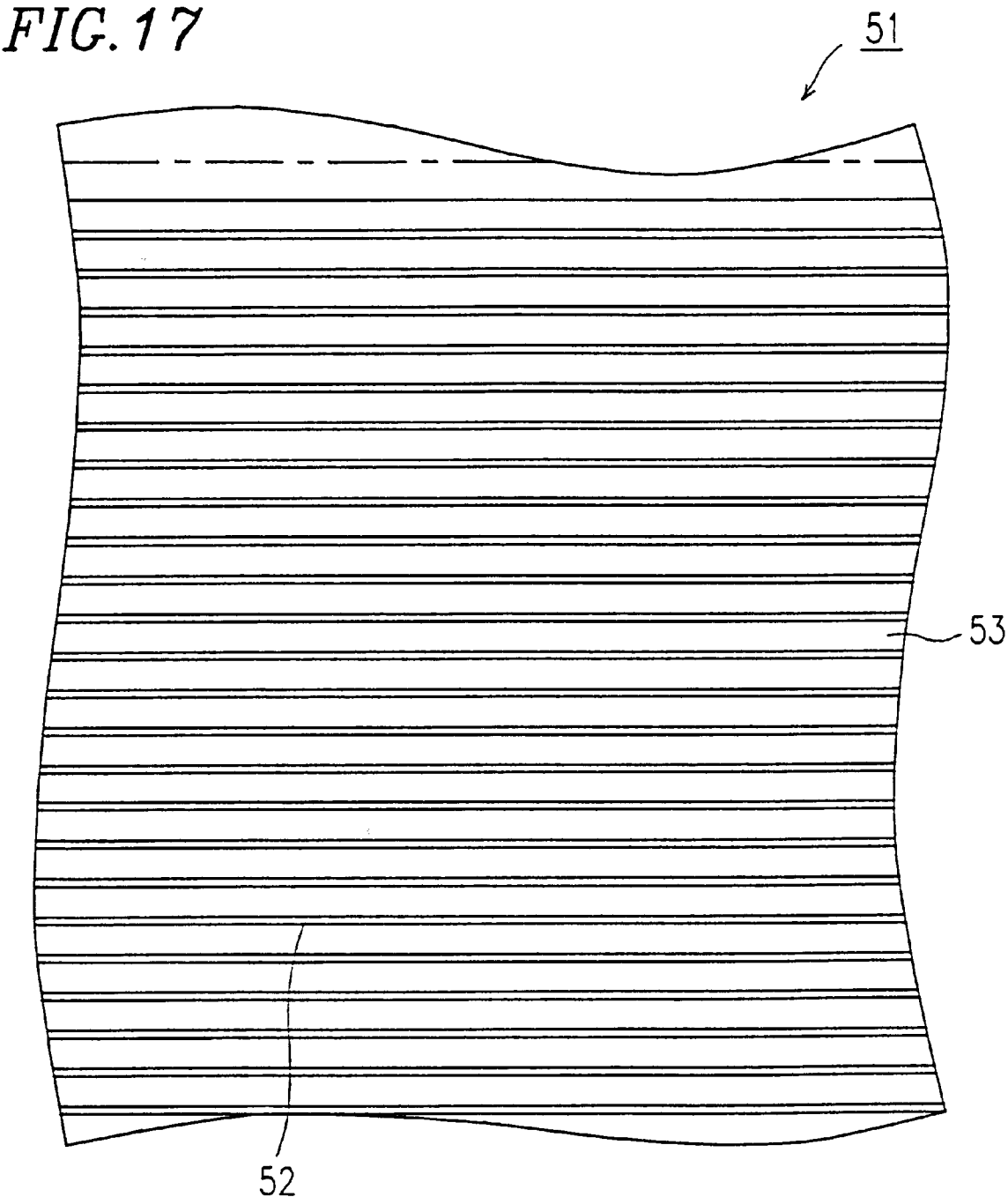
FIG. 17 is a partial enlarged plan view of a display pixel portion of a conventional counter substrate.
Figure 18:
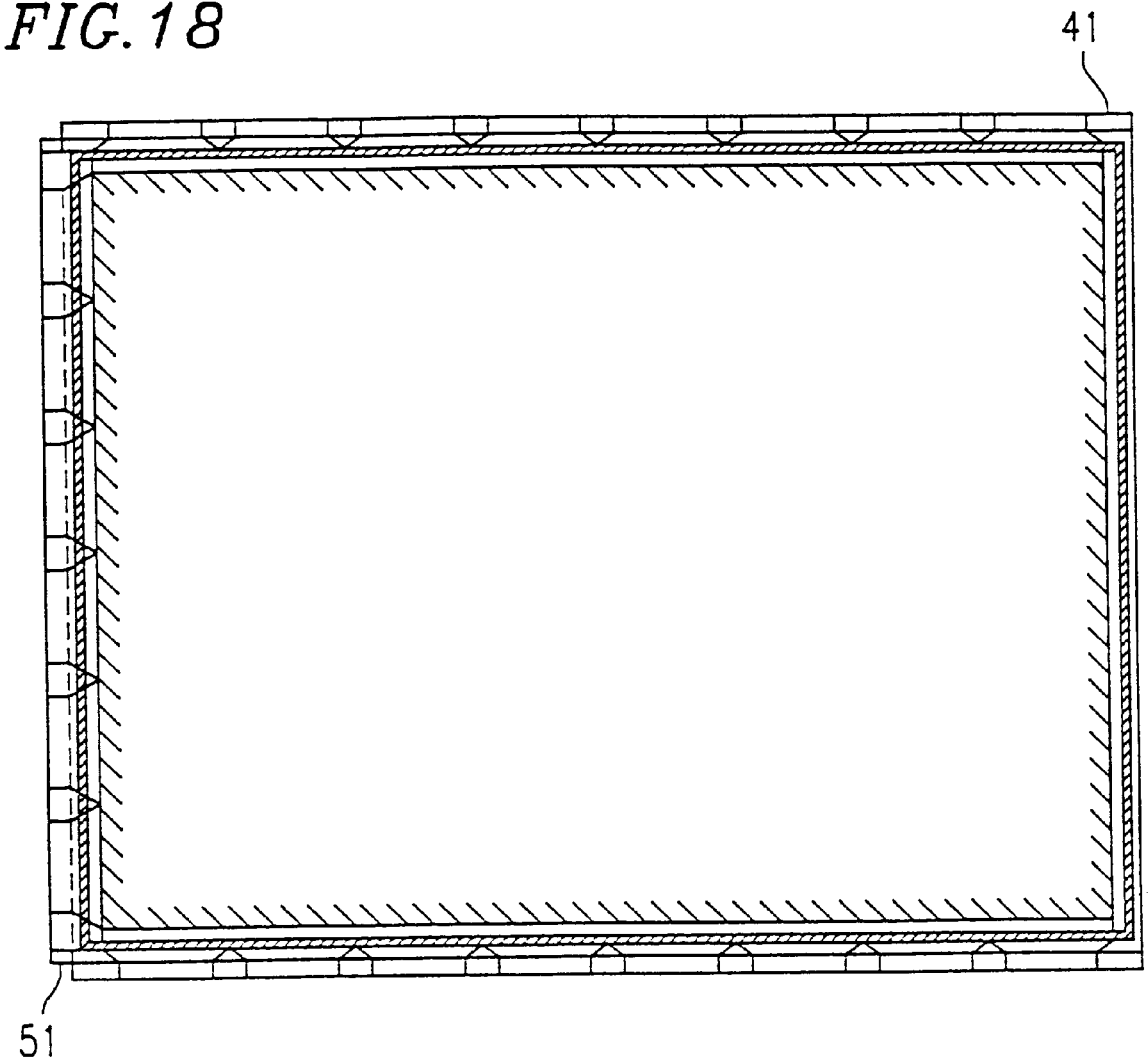
FIG. 18 is a plan view of the conventional liquid crystal display apparatus.
Figure 19:
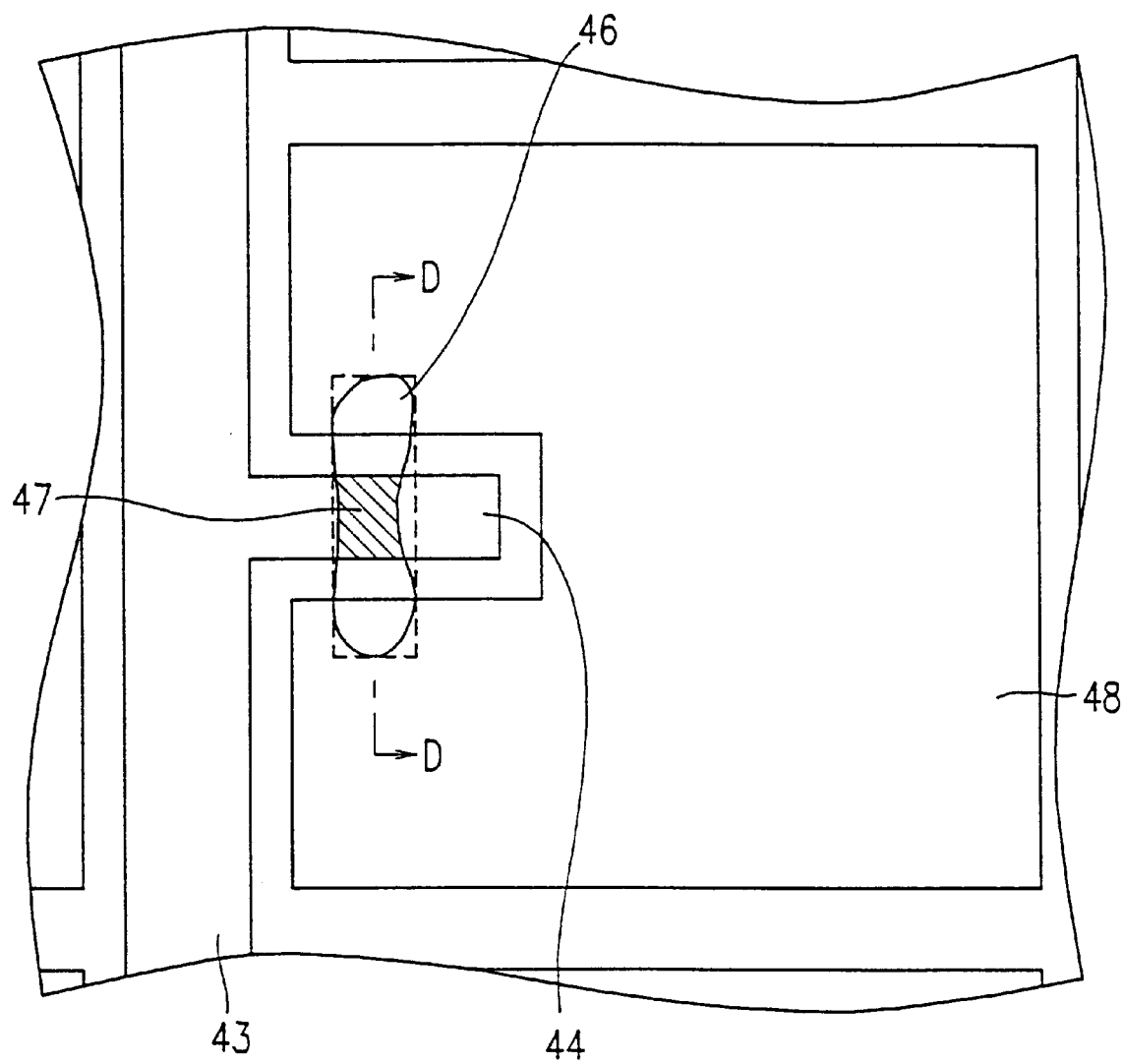
FIG. 19 is a partial enlarged view of the element-formed substrate of the conventional liquid crystal display apparatus.
Figure 20:
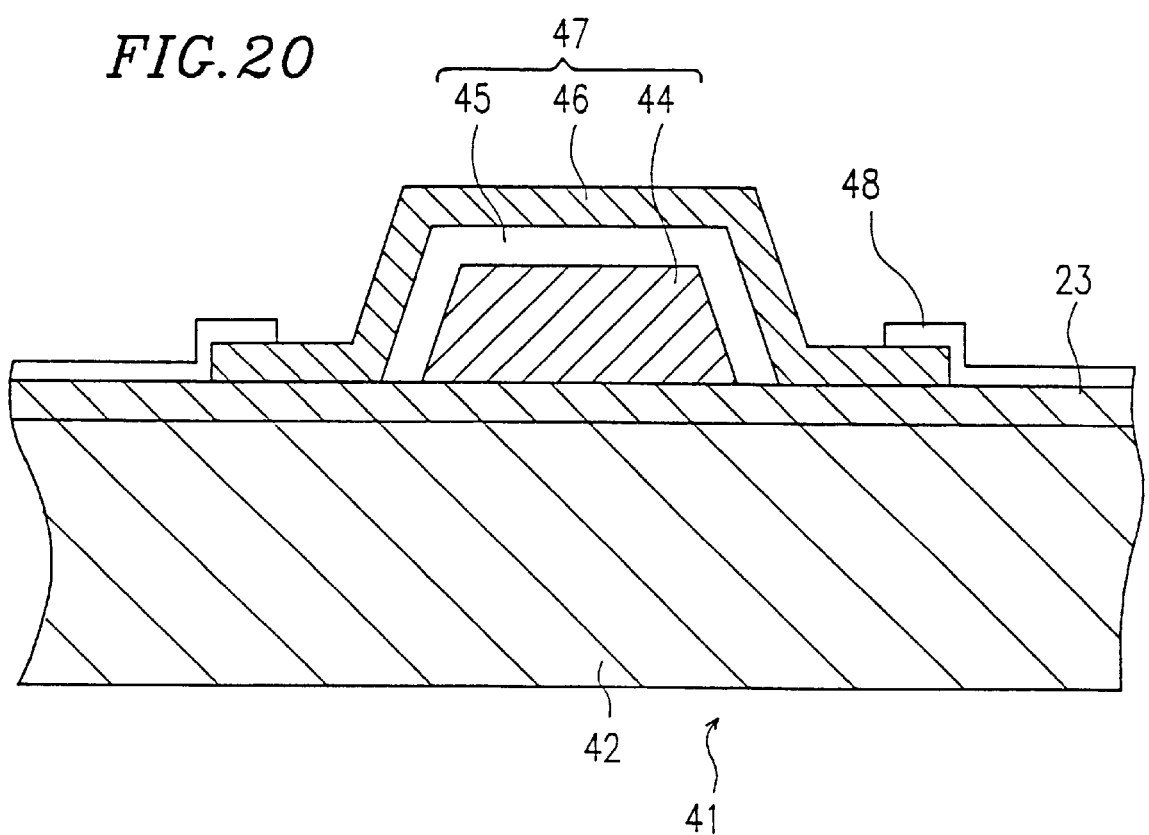
FIG. 20 is a sectional view taken along line D—D of FIG. 19.

FIGS. 13A and 13B show alternative examples where different shapes of upper electrodes 7 and island portions 60a and 60b (FIG. 13A) are formed. In these cases, similar effects to those described in Examples 2 can be obtained.

Thus, as described above, in the liquid crystal display apparatus of Examples 2 to 4, the upper electrode of each MIM element is formed together with island portion(s), or both ends of the upper electrode are made wider than the portion thereof overlapping the lower electrode. With this structure, the size of the upper electrode which determines the characteristics of the MIM element can be precise. Accordingly, the shape of the MIM elements in the display plane can be uniform, and thus, a liquid crystal display apparatus without display variation over the entire display plane can be fabricated with good production yield.

Since the upper electrodes are made of Ti, the positive-negative symmetry of the I-V characteristic of the MIM elements can be improved, and no facility for removing a harmful substance is required.

The island portions for lowering the etching rate at the etching of the upper electrodes are formed from the same film and in the same step as those used for the formation of the upper electrodes. Thus, a liquid crystal display apparatus without display variation can be fabricated efficiently without increasing the number of fabrication steps.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display apparatus comprising a pair of substrates facing each other and a liquid crystal layer interposed between the pair of substrates, at least one of the pair of substrates having on a surface thereof:
    pixel electrodes arranged in rows and columns;
    a plurality of signal lines; and
    a plurality of nonlinear switching elements for connecting each of the plurality of signal lines to a corresponding column of pixel electrodes, each of the switching elements having a lower electrode, an insulating film formed on the lower electrode, and an upper electrode formed on the insulating electrode, the lower electrode being a branch of the corresponding signal line,
    wherein the lower electrode has a first portion with a width larger than a width of a second portion overlapped by the insulating film and the upper electrode, the first portion being located farther from the corresponding signal line than the second portion.

2. A liquid crystal display apparatus according to claim 1, further comprising at least one island portion which is formed from a same film used for the formation of the lower electrode near the lower electrode and which is formed so as to substantially surround the lower electrode.

3. A liquid crystal display apparatus according to claim 2, wherein a plurality of island portions are formed near the lower electrode, each of the plurality of island portions has a side facing the lower electrode, and the distance between the side of one of the plurality of island portions and the lower electrode is substantially equal to the distance between the side of any other one of the plurality of island portions and the lower electrode.

4. A liquid crystal display apparatus according to claim 3, wherein the lower electrode is in a T shape, and a plurality of island portions of an L shape are formed near the lower electrode.

5. A liquid crystal display apparatus according to claim 2, wherein an end of the upper electrode and a portion of the pixel electrode are in direct contact with the island portion so as to realize ohmic contact between the lower electrode and the pixel electrode.

6. A liquid crystal display apparatus according to claim 1, wherein light shade films are formed from a same film used for the formation of the signal lines on at least one of the pair of substrates at regions between the adjacent pixel electrodes.

7. A liquid crystal display apparatus according to claim 6, wherein the signal lines, the pixel electrodes, and the light shade films are formed on one of the pair of substrates, and additional light shade films are formed on the other substrate at regions facing the regions between the adjacent pixel electrodes.

8. A liquid crystal display apparatus according to claim 7, wherein a portion of each of the light shade films overlaps each of the signal lines, the width of the portion being 10 $\mu$m or less.

9. A liquid crystal display apparatus according to claim 7, wherein all the additional light shade films are electrically connected to one another.

10. A liquid crystal display apparatus according to claim 1, further comprising at least one island portion which is formed from a same film used for the formation of the lower electrode near the lower electrode, wherein the island portion is formed in the vicinity of a laminated portion of the lower electrode, the insulating film and the upper electrode.

11. A liquid crystal display apparatus according to claim 10, wherein a plurality of island portions are formed near the lower electrode, each of the plurality of island portions has a side facing the lower electrode, and the distance between the side of one of the plurality of island portions and the lower electrode is substantially equal to the distance between the side of any other one of the plurality of island portions and the lower electrode.

12. A liquid crystal display apparatus according to claim 11, wherein the lower electrode is in a T shape, and a plurality of island portions in an L shape are formed near the lower electrode.

13. A liquid crystal display apparatus according to claim 10, wherein an end of the upper electrode and a portion of the pixel electrode are in direct contact with the island portion so as to realize ohmic contact between the lower electrode and the pixel electrode.

14. A liquid crystal display apparatus comprising a pair of substrates facing each other and a liquid crystal layer interposed between the pair of substrates, at least one of the pair of substrates having on a surface thereof:
   pixel electrodes arranged in rows and columns;
   a plurality of signal lines;
   a plurality of nonlinear switching elements for connecting each of the plurality of signal lines to a corresponding column of pixel electrodes, each of the switching elements having a lower electrode, an insulating film formed on the lower electrode, and an upper electrode formed on the insulating film, the lower electrode being a branch of the corresponding signal line; and
   at least one island portion which is formed near the upper electrode from the same film used for formation of the upper electrode,
   wherein the island portion is formed so as to substantially surround the upper electrode,
   wherein the upper electrode has a first portion with a width larger than a width of a second portion overlapping the lower electrode and the insulating film, the first portion being located farther from the corresponding signal line than the second portion.

15. A liquid crystal display apparatus according to claim 10, wherein the upper electrode is made of titanium.

16. A liquid crystal display apparatus comprising a pair of substrates facing each other and a liquid crystal layer interposed between the pair of substrates, at least one of the pair of substrates having on a surface thereof:
   pixel electrodes arranged in rows and columns;
   a plurality of signal lines; and
   a plurality of nonlinear switching elements for connecting each of the plurality of signal lines to a corresponding column of pixel electrodes, each of the switching elements having a lower electrode, an insulating film formed on the lower electrode, and an upper electrode formed on the insulating film, the lower electrode being a branch of the corresponding signal line,
   wherein at least one island portion is formed from a same film used for the formation of the upper electrode near the upper electrode,
   and wherein the island portion is formed so as to substantially surround the upper electrode.

17. A method for fabricating a liquid crystal display apparatus comprising a pair of substrates facing each other and a liquid crystal layer interposed between the pair of substrates, the method comprising the steps of:
   forming a plurality of signal lines and pixel electrodes arranged in rows and columns on at least one of the pair of substrates; and
   forming a plurality of nonlinear switching elements for connecting each of the plurality of signal lines to a corresponding column of pixel electrodes, each of the switching elements having a lower electrode, an insulating film formed on the lower electrode, and an upper electrode formed on the insulating film, the lower electrode being a branch of the corresponding signal line,
   wherein the step of forming a plurality of nonlinear switching elements includes a step of forming at least one island portion from a same film used for the formation of the upper electrode near the upper electrode, so as to lower an etching rate at a portion of the same film which is to be the upper electrode,
   and wherein the island portion is formed so as to substantially surround the upper electrode.

18. A method for fabricating a liquid crystal display apparatus comprising a pair of substrates facing each other and a liquid crystal layer interposed between the pair of substrates, the method comprising the steps of:
   forming a plurality of signal lines and pixel electrodes arranged in rows and columns on at least one of the pair of substrates; and
   forming a plurality of nonlinear switching elements for connecting each of the plurality of signal lines to a corresponding column of pixel electrodes, each of the switching elements having a lower electrode, an insulating film formed on the lower electrode, and an upper electrode formed on the insulating film, the lower electrode being a branch of the corresponding signal line,
   wherein the step of forming a plurality of nonlinear switching elements includes a step of forming at least one island portion from a same film used for the formation of the lower electrode near the lower electrode, so as to lower an etching rate at a portion of the same film which is to be the lower electrode,
   and wherein the island portion is formed so as to substantially surround the upper electrode.

* * * * *